(12) United States Patent
Naritomi et al.

(10) Patent No.: US 9,017,569 B2
(45) Date of Patent: Apr. 28, 2015

(54) COPPER ALLOY COMPOSITE AND METHOD FOR MANUFACTURING SAME

(71) Applicant: Taisei Plas Co., Ltd., Tokyo (JP)

(72) Inventors: Masanori Naritomi, Tokyo (JP); Naoki Andoh, Tokyo (JP)

(73) Assignee: Taisei Plas Co., Ltd., Tokyo (JP)

( * ) Notice: Subject to any disclaimer, the term of this patent is extended or adjusted under 35 U.S.C. 154(b) by 0 days.

(21) Appl. No.: 14/223,337

(22) Filed: Mar. 24, 2014

(65) Prior Publication Data

US 2014/0202983 A1    Jul. 24, 2014

Related U.S. Application Data

(62) Division of application No. 12/594,919, filed as application No. PCT/JP2008/056820 on Apr. 4, 2008, now abandoned.

(30) Foreign Application Priority Data

Apr. 6, 2007    (JP) .................................. 2007-100727

(51) Int. Cl.
*C03C 15/00*    (2006.01)
*B32B 37/02*    (2006.01)
(Continued)

(52) U.S. Cl.
CPC ......... *B32B 37/02* (2013.01); *Y10T 428/24355* (2015.01); *C23F 1/18* (2013.01); *B29C 70/088* (2013.01); *B29K 2705/10* (2013.01); *B29K 2995/0072* (2013.01); *B32B 7/12* (2013.01); *B32B 15/14* (2013.01); *B32B 27/04* (2013.01)

(58) Field of Classification Search
CPC ................. C23F 1/18; C23F 1/16; C23F 1/44
USPC ................ 216/100, 105, 108; 428/312.8, 457
See application file for complete search history.

(56) References Cited

U.S. PATENT DOCUMENTS

| 3,958,317 A | 5/1976 | Peart et al. |
| 4,409,037 A | 10/1983 | Landau |

(Continued)

FOREIGN PATENT DOCUMENTS

| JP | 57-105346 A | 6/1982 |
| JP | 2-11777 A | 1/1990 |

(Continued)

OTHER PUBLICATIONS

International Search Report for PCT/JP2008/056820, mailing date of Jul. 15, 2008.

*Primary Examiner* — Binh X Tran
(74) *Attorney, Agent, or Firm* — Westerman, Hattori, Daniels & Adrian, LLP

(57) ABSTRACT

A method for preparing a copper alloy given a certain special surface shape yields tremendous bonding strength through compatibility with an epoxy resin adhesive. With a composite part in which this technology is utilized to integrate a copper alloy member as a cover material with a CFRP, it is possible to take advantage of the characteristics of both the copper alloy and the FRP due to the tremendous bonding strength. In a step in which an FRP prepreg is put into a mold and heated and cured, usually the mold is first coated with a release agent to facilitate release from the mold, but with high-technology CFRP, bleeding of the release agent often diminishes the properties. A copper alloy sheet 21 is used as a cover material, and a CFRP 22 is cured.

4 Claims, 10 Drawing Sheets

(51) Int. Cl.
  C23F 1/18   (2006.01)
  B29C 70/08  (2006.01)
  B32B 7/12   (2006.01)
  B32B 15/14  (2006.01)
  B32B 27/04  (2006.01)
  B29K 705/10 (2006.01)

(56) References Cited

U.S. PATENT DOCUMENTS

| | | |
|---|---|---|
| 4,728,384 A | 3/1988 | Goel |
| 5,965,036 A | 10/1999 | Maki et al. |
| 6,521,139 B1 | 2/2003 | Kondo et al. |
| 7,704,562 B2 * | 4/2010 | Cordani, Jr. ............... 427/407.1 |
| 2003/0066754 A1 * | 4/2003 | Seita et al. .................... 205/220 |
| 2005/0040535 A1 * | 2/2005 | Kawata et al. ................ 257/765 |
| 2005/0067378 A1 * | 3/2005 | Fuerhaupter et al. ........... 216/34 |
| 2009/0025966 A1 * | 1/2009 | Shimoosako et al. ........ 174/256 |
| 2010/0221555 A1 * | 9/2010 | Imada et al. .................. 428/433 |

FOREIGN PATENT DOCUMENTS

| | | |
|---|---|---|
| JP | 10-265872 A | 10/1998 |
| WO | 03/006150 A1 | 1/2003 |
| WO | 2004/041532 A1 | 5/2004 |
| WO | 2008/047811 A1 | 4/2008 |
| WO | 2008/069252 A1 | 6/2008 |
| WO | 2008/078714 A1 | 7/2008 |
| WO | 2008/081933 A1 | 7/2008 |

* cited by examiner

APPARATUS: JSM 7401F
ACCELERATION VOLTAGE (kV): 2.0
MAGNIFICATION: ×10,000
IMAGE: LEI
(LOWER DETECTOR)
MEASUREMENT DATE: 8/9/06

APPARATUS: JSM 7401F
ACCELERATION VOLTAGE (kV): 2.0
MAGNIFICATION: ×100,000
IMAGE: SEI
(SECONDARY ELECTRON IMAGE)
MEASUREMENT DATE: 8/9/06

APPARATUS: JSM 7401F
ACCELERATION VOLTAGE (kV): 2.0
MAGNIFICATION: ×10,000
IMAGE: LEI
(LOWER DETECTOR)
MEASUREMENT DATE: 2/20/07

C1020_10k

APPARATUS: JSM 7401F
ACCELERATION VOLTAGE (kV): 2.0
MAGNIFICATION: ×100,000
IMAGE: SEI
(SECONDARY ELECTRON IMAGE)
MEASUREMENT DATE: 2/20/07

C1020_100k

KFC_10k

APPARATUS: JSM 7401F
ACCELERATION VOLTAGE (kV): 2.0
MAGNIFICATION: ×10,000
IMAGE: LEI
(LOWER DETECTOR)
MEASUREMENT DATE: 2/20/07

KFC_100k

APPARATUS: JSM 7401F
ACCELERATION VOLTAGE (kV): 2.0
MAGNIFICATION: ×100,000
IMAGE: SEI
(SECONDARY ELECTRON IMAGE)
MEASUREMENT DATE: 2/20/07

APPARATUS: JSM 7401F
ACCELERATION VOLTAGE (kV): 2.0
MAGNIFICATION: ×10,000
IMAGE: LEI
(LOWER DETECTOR)
MEASUREMENT DATE: 2/20/07

C5191_10k

APPARATUS: JSM 7401F
ACCELERATION VOLTAGE (kV): 2.0
MAGNIFICATION: ×100,000
IMAGE: SEI
(SECONDARY ELECTRON IMAGE)
MEASUREMENT DATE: 2/20/07

C5191_100k

US 9,017,569 B2

COPPER ALLOY COMPOSITE AND METHOD FOR MANUFACTURING SAME

CROSS-REFERENCE TO RELATED APPLICATIONS

This application is a divisional of U.S. application Ser. No. 12/594,919 filed on Dec. 16, 2009, now abandoned, which is a 371 of PCT/JP2008/056820 filed on Apr. 4, 2008, which is based upon and claims the benefit of priority from Japanese Patent Application No. 2007-100727 filed on Apr. 6, 2007, the entire contents of which being incorporated herein by reference.

TECHNICAL FIELD

This invention relates to a copper alloy composite used in moving machinery, electrical devices, medical devices, general machinery, and other such devices, and a method for manufacturing this composite. More specifically, this invention relates to a novel, fundamental copper alloy composite used in parts for automobiles, aircraft, ships, and other such moving machinery, structures, and so forth, and a method for manufacturing this composite, and more particularly relates to a copper alloy composite that makes use of both a copper alloy part and a fiber-reinforced plastic part, and a method for manufacturing this composite.

BACKGROUND ART

Techniques for integrating metal and metal, or metal and resin, is needed in a wide range of fields, such as the manufacture of parts used in automobiles, household electrical products, industrial machinery, and so forth, and many different adhesives have been developed for this purpose. Of these, some extremely good adhesives have been commercially available and are in use. For example, adhesives that exhibit their function at normal temperature or when heated are used to bond and integrate metals with synthetic resins, and this method is the standard bonding method in use today.

Meanwhile, bonding methods that do not involve the use of an adhesive have been researched. An example is a method in which a high-strength engineering plastic is integrated with a light metal such as magnesium, aluminum, or an alloy of these, or an iron alloy such as stainless steel, without any adhesive being interposed between the materials. For instance, as a method for simultaneously bonding by injection or another such method (hereinafter referred to as "injection bonding"), a manufacturing technique has been developed in which a polybutylene terephthalate resin (hereinafter referred to as PBT) or a polyphenylene sulfide resin (hereinafter referred to as PPS) is injection bonded to an aluminum alloy (see Patent Documents 1 and 2, for example). In addition, it has been proven in the past that magnesium alloys, copper alloys, titanium alloys, stainless steel, and the like can be injection bonded by using a similar type of resin (Patent Documents 3, 4, 5 and 6).

These inventions were all made by the present inventors, but they are based on simple bonding theory. These are the "NMT" theory related to the injection bonding of aluminum alloys, and the "new NMT" theory related to the injection bonding of all metal alloys. One of the present inventors, Ando, who is the creator of the "new NMT" theory that can be used in a broader sense, has described the theory as follows. To produce injection bonding and its tremendous bonding strength, various conditions pertain to both the metal alloy side and the injected resin side, and starting with the metal side, the following three conditions have to be met. Condition (1) is that the metal alloy have a rough profile curve (roughness curve) in which chemical etching produces a period (spacing) between peaks or between valleys of 1 to 10 µm, and the peak-valley height difference is preferably about one-half this, specifically, about 0.5 to 5 µm.

Obtaining a rough surface such as this 100% by chemical reaction is actually impossible; more specifically, condition (1) is deemed to have been satisfied if a roughness curve can be plotted in which the texturing appears at an irregular period between 0.2 and 20 µm and the maximum height difference thereof is between 0.2 and 5 µm, or if scanning analysis by scanning probe microscope reveals a rough surface (roughness) in which the mean width of the profile elements (RSm) of the profile curve elements referred to in JIS standards (JIS B 0601:2001) is 0.8 to 10 µm and the maximum height of the maximum height of profile (maximum height roughness) (Rz) is 0.2 to 5 µm. The present inventors call this "a surface with micron-order roughness" for short. There is also a condition (2), which is that there be the above-mentioned large textured surface, or more precisely, a finely textured surface with a period of at least 10 nm, and preferably 50 nm, on the inner walls of the depressions. The last one is condition (3), which is that the surface that forms the fine texturing have ceramic layer, or more specifically, a metal oxide layer that is thicker than the natural oxidation layer, or an intentionally produced metal phosphorus oxide layer. It is also preferable if this hard layer is a thin layer with a thickness of only a few nanometers to a few dozen nanometers.

The condition on the resin side is that it be a hard crystalline resin, which can be compounded with another suitable polymer, for example, to slow down the crystallization during quenching. Actually, a resin composition in which another suitable polymer and glass fibers have been compounded with PBT, PPS, or another such crystalline resin can be used. These can be used to perform injection bonding in an injection molding mold and a standard injection molding machine; this process is described according to the "new NMT" theory of the inventors. The injected molten resin is guided into a mold whose temperature is about 150° C. than the melting point of the resin, but it is seen to be cooled in the runner and other channels and drop below its melting point. Specifically, it will probably be understood that even though the temperature drops below the melting point when a molten crystalline resin is quenched, crystals of that resin are produced and the resin changes into a solid in zero time.

In other words, a state in which the resin is molten while being under its melting point, which is called a super-cooled state, only exists for an extremely short time. With PBT or PPS that has been specially compounded as discussed above, this super-cooling time is thought to be slightly longer, and this was utilized so that the resin would penetrate into the large depressions on the micron-order metal before its viscosity was sharply increased by the production of a large quantity of microcrystals. The molten resin continues to cool even after penetrating these depressions, and the number of microcrystals increases and the viscosity rises sharply. Because of this, whether or not the molten resin can reach the deepest part of the depressions is determined by the size and shape of the depressions. Experiment results indicate that regardless of the type of metal, the resin penetrated quite far as long as the depressions had a diameter of at least 1 µm and a depth of 0.5 to 5 µm. Furthermore, if the inner walls of the depressions are rough when viewed microscopically, part of the resin will also penetrate into the gaps of this ultrafine texturing, and as a result, even if a pull-out force is applied to the resin side, the resin will hang on and be resistant to coming loose.

If this rough surface is a metal oxide, it will be hard and have a hooking effect much like a spike. If the texturing period is at least 10 μm, the result will be weaker bonding, but the reason for this is clear. Specifically, if we consider a cluster of dimple-like depressions as an example, the larger is the depression diameter, the fewer dimples there will be per unit of surface area, and as the depressions become larger, the above-mentioned spike (hook) latching effect is diminished. As to the bonding itself, it is a question of the resin component and the metal alloy surface, but when reinforcing fiber or an inorganic filler is added to a resin composition, the coefficient of linear expansion of the resin as a whole draws closer to that of a metal alloy, so it is easier to maintain bonding strength after bonding. According to this hypothesis, when a PBT or PPS resin or the like is injection bonded to the surface of a magnesium alloy, copper alloy, titanium alloy, stainless steel, or the like, the result is a strong integrated material with a shear breaking force of 200 to 300 Kgf/cm$^2$ (approximately 20 to 30 N/mm$^2$, or 20 to 30 MPa).

The present inventors proved the "new NMT" theory to be true by injection bonding many different metal alloys, but the hypothesis used here is based on an assumption related to a fundamental portion of polymer physical chemistry, and ordinarily would have to be reviewed by many chemists and scientists. For instance, the inventors have taken it upon themselves to discuss molten crystalline resin during quenching, but as to whether or not the crystallization rate really does drop, this was not something that was debated in the past from the perspective of polymer physics, and while it is believed to be true, frankly it has not yet been proven. Specifically, this is a fast reaction that takes place under high temperature and pressure, making direct measurement impossible. Also, this hypothesis sets forth a completely physical anchor effect theory for bonding, and is not in complete agreement with conventional wisdom and standard theory. Specifically, most of the current books written by specialists in the field of adhesion ascribe this to chemical processes.

The present inventors resigned themselves to the difficulty of direct experimentation that would lead to a proof of their hypothesis, they decided to take an opposite approach. Specifically, seeing that the "new NMT" theory can also be applied to adhesive bonding, they determined to corroborate high-performance adhesion by a similar theory. Namely, they used a commercially available multi-purpose epoxy adhesive, varied only the surface condition of the adherend, and sought to find a bonding system that was heretofore unknown.

As to bonding with an adhesive agent, there has already been wonderful progress, and this sophisticated technology has been put to use in the assembly of aircraft. This technology involves a surface treatment that imparts corrosion resistance and minute texturing to a metal alloy, and the use of a high-performance adhesive. However, when it is examined more closely, the surface treatment of the metal seems to be treatment methods that were developed over 40 years ago, such as phosphating, chromating, and anodizing, and even today these methods are used as standard procedure, so progress seems to have come to a halt. Meanwhile, as to the development of the adhesives themselves, mass production of instant adhesives began decades ago, and ever since the much-touted debut of second-generation acrylic adhesives, there has been no word of anything revolutionary.

As to adhesion theory, although the most recent scholarly trends are not known to the present inventors, commercially available books are a vague mix of chemical theory and physical theory, making it seem unlikely that any significant progress will be made in materials. The present inventors were fortunate enough to be working in an era in which the electron microscope, which has a resolution down to just a few nanometers, can be freely and inexpensively used, and looking at these high-resolution micrographs made it possible to come up with the hypotheses related to "NMT" and "new NMT" injection bonding. As a result, they arrived at the above-mentioned hypothesis based entirely on an anchor effect. Consequently, it was anticipated that some new discovery would be made if the physical aspect were given emphasis in experiments into adhesion theory by adhesive bonding.

Meanwhile, copper and copper alloys have the best electrical and thermal conductivity of all practical metals, and also have excellent corrosion resistance. Their specific gravity is around 8.9, and while this makes them relatively heavy metals, they are used in a vast range of applications because of their above-mentioned performance. The present inventors have begun trial production of relay case take-off terminals from tough pitch copper C1100 copper alloy rod and PPS resin using an injection bonding method that has already been developed (Patent Document 4), and wondered if heat diffusers for mobile electronic devices and the like, lead wire take-offs for anti-explosive devices, and other such parts could be manufactured by using an adhesive agent, rather than by injection bonding. In particular, when it comes to tensile strength, carbon fiber reinforced plastic (hereinafter referred to as CFRP) is one of the best of all structural materials, including metals, and it is also super-light, with a specific gravity of 1.6 to 1.7. The inventors thought that parts that take advantage of both light weight and the advantages of copper could be produced by combining this CFRP with a copper alloy having a higher specific gravity.

A CFRP prepreg is a weave or cluster of carbon fiber (hereinafter referred to as CF) that has been impregnated with uncured epoxy resin, and simultaneous curing is possible, and integration is easy, if there is good compatibility with the epoxy adhesive applied to the metal side. Therefore, in producing an integrated product, the inventors felt that the first focus of research and development should be how high the bonding strength between a copper alloy and an epoxy adhesive could be increased and how stable it could be made. A copper alloy also exhibits good corrosion resistance even in seawater with a high salt content. And not only is corrosion resistance good, but very little seaweed adheres to copper parts in seawater and fresh water. For example, it is known that if bacteria adhere to copper or silver coins, they are killed, and this effect is attributed to the redox capability of the tiny amounts of copper ions and silver ions that are dissolved out. To put it another way, these metals are used as coins because of this effect, and it is surmised that this is also the reason why almost no seaweed adheres to the copper plates attached to ships hulls.

It is common knowledge among seafarers that a ship with aged hull paint will become completely covered in seaweed upon mooring in port for just a few days in the summertime. Hull paint itself releases ions of copper or tin in very small amounts at a time, and although there have been improvements of late, it is still a vivid memory that seawater fouling occurred with past hull paint with good anti-seaweed performance. It can be readily understood that no anti-seaweed paint would be necessary if an FRP ship covered with thin copper plates could be manufactured. For example, FIG. 4 shows the tip of a seaplane pontoon made of CFRP covered with a thin copper alloy plate, which is an idea of the present inventors. It is not known whether or not such ideas or specific challenges existed in the past, but if a copper plating that could be adhesively bonded to FRP at extremely high strength could be obtained, it would not be difficult to product a practical pontoon having such a structure.

Because of the above, an attempt was made to develop a method for obtaining a strong bond with a fiber reinforced plastic (hereinafter referred to as FRP), focusing on the development of technology for the surface treatment copper alloys.
Patent Document 1: WO 03/064150 A1
Patent Document 2: WO 2004/041532 A1
Patent Document 3: PCT/JP2007/073526
Patent Document 4: PCT/JP2007/070205
Patent Document 5: PCT/JP2007/074749
Patent Document 6: PCT/JP2007/075287

DISCLOSURE OF THE INVENTION

The present invention adopts the following means for achieving the stated object.

The copper alloy composite of present invention 1 is composed of: a copper alloy part having micron-order roughness produced by chemical etching, whose surface, when observed by electron microscope, has ultrafine texturing in which holes or depressions that are circular in shape with a diameter of 10 to 150 nm or elliptical in shape with an average of major and minor diameters of 10 to 150 nm are present over substantially the entire surface at an irregular spacing of 30 to 300 nm, the surface being mainly a thin layer of cupric oxide; and an adherend that is bonded using, as an adhesive, an epoxy adhesive that has permeated the ultrafine texturing.

The copper alloy composite of present invention 2 is composed of: a copper alloy part having micron-order roughness produced by chemical etching, whose surface, when observed by electron microscope, has ultrafine texturing in which bumps that are circular in shape with a diameter of 10 to 200 nm or elliptical in shape with an average of major and minor diameters of 10 to 200 nm are present over substantially the entire surface, the surface being mainly a thin layer of cupric oxide; and an adherend that is bonded using, as an adhesive, an epoxy adhesive that has permeated the ultrafine texturing.

The alloy composite of present invention 3 is composed of: a copper alloy part having micron-order roughness produced by chemical etching, substantially the entire surface of which is covered with, when observed by electron microscope, ultrafine texturing in which granules or amorphous polygons with a diameter of 10 to 150 nm are lined up and partially melted together in a stacked shape, the surface being mainly a thin layer of cupric oxide; and an adherend that is bonded using, as an adhesive, an epoxy adhesive that has permeated the ultrafine texturing.

The alloy composite of present invention 4 is composed of: a copper alloy part having micron-order roughness produced by chemical etching, substantially the entire surface of which is covered with, when observed by electron microscope, ultrafine texturing in the form of gullies on the slope of a lava plateau, in which granules with a diameter of 10 to 20 nm and amorphous polygons with a diameter of 50 to 150 nm are mixed together in a stacked shape, the surface being mainly a thin layer of cupric oxide; and an adherend that is bonded using, as an adhesive, an epoxy adhesive that has permeated the ultrafine texturing.

The method for manufacturing the copper alloy composite of present invention 1 comprises a step of shaping a copper alloy part by machining or the like from a casting or an intermediate material, a chemical etching step of immersing the shaped copper alloy part in an acidic aqueous solution containing an oxidant, a surface hardening step of immersing the chemically etched copper alloy part in a strongly basic aqueous solution containing an oxidant, a step of coating the necessary portions of the copper alloy part with an uncured epoxy resin, a step of adjusting a prepreg of a fiber-reinforced plastic to the required size, a step of applying the prepreg to the coated side of the copper alloy part, and a step of positioning the prepreg and the copper alloy part, and heating the prepreg and the copper alloy part while holding them down, to cure the epoxy resin component.

The method for manufacturing the copper alloy composite of present invention 2 comprises a step of shaping a copper alloy part by machining or the like from a casting or an intermediate material, a chemical etching step of immersing the shaped copper alloy part in an acidic aqueous solution containing an oxidant, to form ultrafine texturing on the surface thereof, a surface hardening step of immersing the chemically etched copper alloy part in a strongly basic aqueous solution containing an oxidant, a step of coating the necessary portions of the copper alloy part with an uncured epoxy resin, a hardening pretreatment step of putting the copper alloy part that has been coated with the uncured epoxy resin in a sealed vessel, depressurizing, and then pressurizing to force the uncured epoxy resin into the ultrafine texturing on the copper alloy surface, a step of adjusting a prepreg of a fiber-reinforced plastic to the required size, a step of applying the prepreg of a fiber-reinforced plastic to the coated side of the copper alloy part, and a step of positioning the prepreg and the copper alloy part, and heating the prepreg and the copper alloy part while holding them down, to cure the epoxy resin component.

The various elements of the present invention mentioned above will now be described in detail.

Copper Alloy Part

The "copper" and "copper alloy" used in the present invention refer to copper, brass, phosphor bronze, nickel silver, aluminum bronze, and the like, and apply to all copper alloys, including pure copper alloys such as C1020 and C1100 set forth in the Japanese Industrial Standards (JIS H 3000 series), C2600-series brass alloys, C5600-series cupro-nickel alloys, and other copper alloys developed for various applications, including iron alloys used for connectors. Also applicable are plastically worked products that are intermediate materials of these, such as sheeting, strip, tubing, rod, and wire, which are subjected to cutting, stamping, or other mechanical working to obtain a part in the desired shape, as well as forged parts and so forth.

Surface Treatment/Pretreatment/Chemical Etching of Copper Alloy Part

The copper alloy part is preferably first immersed in a degreasing tank in which oil and fingerprints are removed from the surface mechanically. More specifically, it is preferable if a commercially available copper alloy degreaser is put in water in the concentration indicated by the chemical manufacturer to prepare an aqueous solution, and the copper alloy part is immersed in this and rinsed with water, but it is also possible to use a commercially available degreaser for iron, stainless steel, aluminum, or the like, as well as an aqueous solution obtained by dissolving an industrial-use or household-use neutral detergent. More specifically, it is preferable if a commercially available degreaser or neutral detergent is dissolved in water in a concentration of from a few percent to 5%, and the copper alloy part is soaked for 5 to 10 minutes at 50 to 70° C. and then rinsed with water.

Next, preliminary base washing is preferably performed, in which the copper alloy part is immersed in a caustic soda aqueous solution with a concentration of a few percent and maintained at about 40° C., after which it is rinsed with water. It is also preferable if the copper alloy part is immersed in an aqueous solution containing hydrogen peroxide and sulfuric acid, then rinsed with water and chemically etched. This chemical etching preferably involves the use of an aqueous solution containing a few percent of both sulfuric acid and hydrogen peroxide between 20° C. and close to normal temperature. The immersion time here will vary with the type of alloy, but ranges from a few minutes to 20 minutes. In these pretreatment steps, the resulting copper alloy will have a roughness that is favorable for most copper alloys, specifically, it will have texturing with an irregular period between 0.2 and 20 μm, and the maximum height difference of this texturing will be about 0.2 to 10 μm, or will be such that analysis by scanning probe microscope reveals a mean length (RSm) of the roughness curve referred to in JIS standards (JIS B 0601:2001 (ISO 4287)) is 0.8 to 10 μm and the maximum height roughness (Rz) is 0.2 to 10 μm. Preferably, the maximum height roughness (Rz) is 0.2 to 5 μm.

However, and this is particularly true with a pure copper-based copper alloy, the rough surface obtained as a result of the above-mentioned chemical etching also often results in a texturing period of over 10 μm, and the mean value thereof (RSm) is greater than that of other copper alloys besides those based on pure copper. On the other hand, given the large RSm, the texturing height difference is small. In particular, with C1020 (oxygen-free copper) and the like that have a high copper purity, it is clear that the metal crystal grain size is large, and obviously often gives a roughness curve with a large period as mentioned above, and it was surmised that there is a direct correlation between texturing period and the metal crystal grain size. With chemical etching performed not only with pure copper alloys, but also with various other metals, it is surmised that most of the etching can probably be attributed to the fact that corrosion starts from the crystal grain boundaries. At any rate, even if the texturing period is on the micron order, if the texturing height difference is small in proportion to that period, the present invention will tend not to have as much of an effect. Consequently, if it is felt that there is inadequate roughness of large texturing, a corresponding treatment is preferably carried out, which will be discussed below.

Surface Treatment of Copper Alloy Part: Surface Hardening Treatment

After undergoing pretreatment, the copper alloy part is oxidized. In the electronic parts industry, there is a known method called a blackening treatment; the oxidation performed in the present invention, although it differs in its purpose and extent of oxidation, is the same as far as the step itself is concerned. Chemically speaking, the surface layer of the copper alloy is oxidized by an oxidant under strongly basic conditions. When a copper atom is ionized by an oxidant, if the surroundings are strongly basic, the atom will turn into black cupric oxide without dissolving in the aqueous solution. When a copper alloy part is used as a heat sink or heat generating material part, the surface is blackened in order to improve the efficiency of the dissipation or absorption of radiant heat, and this treatment is called a blackening treatment in the electronic parts industry where copper is used. This blackening treatment can be utilized for the surface treatment of the present invention. The purpose of this blackening treatment, however, is to create a surface that is hard and has ultrafine texturing on the nano-order on a copper alloy part that has roughness, so it is not literally blackening.

A commercially available blackening agent can be used at the concentration and temperature recommended by the manufacturer, but the immersion time in this case is far shorter than during so-called blackening. Actually, the immersion time is adjusted by observing the obtained alloy under an electron microscope. The present inventors found that it is preferable to use an aqueous solution containing about 5% sodium chlorite and about 10% caustic soda, at 60 to 70° C., and that it is preferable in that case for the immersion time to be about 0.5 to 1.0 minute. This procedure covers the copper alloy with a thin layer of cupric oxide, the surface of which is rough, with a roughness on the micron order, and when this is observed under an electron microscope, it is seen that there are formed in this rough surface circular holes with a diameter of 20 to 150 nm, or elliptical holes with a major or minor diameter of 20 to 150 nm.

The openings of these circular or elliptical holes are in the form of ultrafine texturing that is present over the entire surface at a period of 100 to 200 nm (an example of this is shown in the photograph of FIG. 5). The crux of the matter is that when this surface hardening treatment is performed, ultrafine texturing and a surface hardened layer are both obtained at the same time. It was also effectively found that if the immersion time in the above-mentioned treatment solution is increased to 2 to 3 minutes, for example, the surface hardening treatment will be excessive, and will actually weaken bonding strength, so this is undesirable.

Surface Treatment of Copper Alloy Part: Repeated Treatment

With the etching of a pure copper-based copper alloy discussed above, observational results have revealed a definite pattern in which the corrosion of the copper occurs from the metal crystal grains, and as mentioned above, when the crystal grain size is particularly large, that is, with oxygen-free copper (C1020), good bonding strength cannot be achieved by the above-mentioned chemical etching and surface hardening treatment alone. In short, depressions of the most important size were not produced as anticipated.

The inventors discovered a method for dealing with such situations. The result is an extremely simple method, in which a surface hardening treatment (blackening) is first performed, after which this product is again immersed for a short time in the etching solution and re-etched, after which it is again blackened. As a result, the period of micron-order roughness approached about 10 μm or less, as anticipated, and observation by electron microscope showed that the ultrafine texturing looked the same as when this repeated treatment was not performed.

Adherend

The adherend referred to in the present invention may be made of any material, but means a copper alloy part made of a copper alloy which has been treated as above to form ultrafine texturing, an FRP composed of long fiber, short fiber, a fiber cloth, or the like and containing an epoxy adhesive, and so on.

Epoxy Resin (Adhesive) and Application Thereof

There are some outstanding commercially available products for the epoxy adhesive itself. Even if it is produced in house, the raw materials can be easily found for sale. Specifically, commercially available bisphenol-type epoxy resins, glycidylamine-type epoxy resins, polyfunctional polyphenol-type epoxy resins, alicyclic epoxy resins, and so forth are commercially available, and all can be used as the material used in the present invention. Also, these epoxy resins can be linked together by reacting them with a polyfunctional third component, such as a polyfunctional oligomer having a plurality of hydroxyl groups, and this product can be used. It is preferable to add a polyfunctional amine compound as a curing agent to one of these epoxy resins, and mix these to obtain an epoxy adhesive.

Adding a filler component, elastomer component, or the like to the cured epoxy resin is preferable because the coefficient of linear expansion will be on a par with that of a copper alloy, and with that of a CFRP material, and the result can serve as a cushioning material if subjected to temperature shock. It is preferable for the elastomer component to be contained in an amount of 0 to 30 weight parts, and specifically no more than 30 weight parts, per combined 100 weight parts of the above-mentioned resin component (epoxy resin component+curing agent component), because this will improve impact resistance and temperature shock resistance. It is undesirable for the amount to be greater than 30 weight parts because the bonding strength will decrease. One elastomer component is a vulcanized rubber powder with a particle size of 1 to 15 μm. If the size is a diameter of a few microns, the particles will be too large to penetrate into the ultrafine texturing on the copper alloy when the adhesive is applied, which means that they will not affect the anchor portion, and will merely remain in the adhesive layer. Therefore, they have the role of resisting temperature shock without lowering bonding strength.

Any kind of vulcanized rubber can be used, but actually it is difficult to pulverize it down to a size of just a few microns, regardless of the type of rubber. As far as the inventors could find, there has not been much research and development into methods for manufacturing vulcanized rubber microparticles. The inventors adopted a method in which a vulcanized rubber or unvulcanized rubber and a thermoplastic resin are cooled with liquid nitrogen, then mechanically pulverized and graded. Unfortunately, the manufacturing efficiency and cost here are not really at a commercial level. Another thing is the use of unvulcanized or semi-crosslinked rubber, and modified super engineering plastics, polyolefin resins, and so forth. An example of a super engineering plastic is "PES 100P" a hydroxy-terminated polyether sulfone made by Mitsui Chemical. Also, polyolefin resins that readily mix with epoxy resins have already been developed, and these can be used favorably.

The inventors have seen that durability with respect to the temperature shock is theoretically inferior to that of powdered unvulcanized rubber, but in actual practice it is still not entirely clear. The evaluation method itself has not been completely perfected with the method of the present inventors. At any rate, even with these unvulcanized elastomers, temperature shock resistance is better when they are admixed. Polyolefin resins such as this include maleic anhydride-modified ethylenic copolymers, glycidyl methacrylate-modified ethylenic copolymers, glycidyl ether-modified ethylene copolymers, ethylene alkyl acrylate copolymers, and so forth. Examples of these maleic anhydride-modified ethylenic copolymers include maleic anhydride-graft modified ethylene copolymers, maleic anhydride-ethylene copolymers, and ethylene-acrylic acid ester-maleic anhydride ternary copolymers. Of these, because a particularly good composite can be obtained, it is preferable to use an ethylene-acrylic acid ester-maleic anhydride ternary copolymer, and a specific example of this ethylene-acrylic acid ester-maleic anhydride ternary copolymer is Bondine, made by Arkema.

Examples of this glycidyl methacrylate-modified ethylenic copolymer include glycidyl methacrylate-graft modified ethylene polymers and glycidyl methacrylate-ethylene copolymers, of which a glycidyl methacrylate-ethylene copolymer is preferable because a particularly favorable composite can be obtained. A specific example of said glycidyl methacrylate-ethylene copolymer is Bondfast (made by Sumitomo Chemical). Examples of said glycidyl ether-modified ethylene copolymers include glycidyl ether-graft modified ethylene copolymers and glycidyl ether-ethylene copolymers. A specific example of said ethylene alkyl acrylate copolymers is Lotryl (made by Arkema).

Filler

A filler may be added to the cured epoxy resin. This filler will be discussed in greater detail. It is preferable to use an epoxy adhesive composition containing a filler in an amount of 0 to 100 weight parts (no more than 100 weight parts), and preferably 10 to 60 weight parts, per 100 weight parts of the combined resin component including the elastomer component. Even more preferably, the total amount of added filler is no more than 50 weight parts per 100 weight parts of the combined resin component. Examples of fillers that are used include reinforcing fibers such as carbon fiber, glass fiber, and aramid fiber, while examples of powdered fillers include calcium carbonate, mica, glass flakes, glass balloons, magnesium carbonate, silica, talc, clay, carbon fiber, and aramid fiber that has been pulverized.

Adjustment of Epoxy Adhesive

Next, the specific work of adjusting the epoxy adhesive will be discussed. The epoxy resin main material, the curing agent, the elastomer, and the filler are thoroughly mixed, and a small amount of an epoxy adhesive solvent (a commonly known, commercially available product) is added and mixed depending on the viscosity, to obtain an adhesive composition (uncured epoxy adhesive). This adhesive composition is applied to the necessary places on the metal alloy part obtained in the step described above. How this is applied does not matter, and may be brushing on by hand, or application by coating machine that automatically applies the adhesive.

Treatment Step after Epoxy Resin Adhesive Application

After coating, the coated product is placed in a vacuum vessel or a pressure vessel, the pressure is reduced to close to a vacuum, and after leaving the product for a few minutes, air is let in to return the vessel to normal pressure (atmospheric pressure), or preferably the product is left under a pressure environment of several atmospheres or several dozen atmospheres. The pressure reduction and elevation cycle is preferably repeated under this pressure environment. This makes it easier for air or gas to escape between the coating material and the metal alloy, and helps the coating material to penetrate into the ultrafine texturing.

In actual mass production, using a pressure vessel and using high-pressure air lead to higher cost both in terms of equipment and expense, so a method in which the step of reducing pressure and returning to normal pressure using the vacuum vessel is carried out one time, or repeated a number of times, is an economical. With the metal alloy of the present invention, sufficiently stable bonding strength can be obtained in a few cycles of reduced pressure and normal pressure. After being taken out of the vessel, the product is preferably left at normal temperature, or under an environment of about 40° C., for about 30 minutes or longer. Specifically, doing this allows a considerable portion of the solvent to be volatilized even if a certain amount of solvent is added to the epoxy adhesive composition.

FRP Prepreg

A commercially available FRP prepreg or CFRP prepreg can be used. As commercially available products, those in which a carbon fiber weave is impregnated with the above-mentioned epoxy resin composition, those in which a film is first made from the above-mentioned uncured epoxy resin, and then superposed with a fiber weave, and so forth are sold as prepregs. The epoxy resin in the prepreg that is used is mostly a dicyandiamide or amine curing type, which maintain a B stage at normal temperature (in an uncured state, but close to a solid), first melt in the process of being heated to a hundred and some few dozen degrees centigrade, and then solidify.

A CFRP prepreg will be discussed. It is cut to the required shape and superposed in the required form to prepare a prepreg portion. Specifically, when a plurality of sheets of a unidirectional prepreg (a prepreg made from a weave in which there are many warp threads and very few weft threads) are superposed, the directions thereof are superposed, or superposed at an angle, so that the directionality of strength of the final CFRP sheeting can be controlled (designed), and there is said to be a great deal of knowledge about how these are put together. Also, with a regular weave of carbon fiber, the number of warp and weft threads is the same, and it is said that if the prepregs are superposed by offsetting the angle 45 degrees each time, strength that is equal in all directions can be produced. In other words, the required number of sheets and how they are superposed is designed ahead of time, each prepreg is cut according to this, and the pieces are put together as designed to complete the preparation.

Prepreg Lamination, and Method for Manufacturing Composite

The above-mentioned FRP prepreg is placed on the above-mentioned metal alloy part that has been coated with an epoxy adhesive composition. When heated in this state, the epoxy resin adhesive and the epoxy resin in the prepreg first melt and then are cured. To join (bond) the two firmly together, they must be heated while being pressed together, and any air contained in the gap must be purged when the epoxy resins are melted. For example, a seat is made in advance in the opposite shape of the face of the metal alloy to be jointed, a polyethylene film is laid over this, the above-mentioned metal alloy part is put in place, the prepreg is placed on this, another polyethylene film is laid over the prepreg, a fixing member (jig) in the final prepreg shape that has been produced separately from a structural material or the like is placed on this, and a weight is placed on top of this, thereby pressing the components together and fixing them during heating and curing. In other words, a jig and a weight are used for joining. Of course, what matters is that the two pieces between pressed together and cured, so various other methods can also be used, such as fixing with screws, rather than using a weight and relying solely on gravity.

Heating is performed by putting the metal alloy part, the FRP prepreg, and the jig all together into a hot air dryer, an autoclave, or another such heating furnace. This heating preferably involves first leaving the pieces for several tens of minutes, usually at 100 to 140° C., to melt the adhesive component and create a gel, then heating for another several tens of minutes with the temperature raised to between 150 and 180° C. for curing. The ideal temperature conditions will vary with the type and amount of the epoxy component, the curing agent component, and so forth. Once the specified heating is complete, the product is allowed to cool, the jig is removed, and the molded article is taken out. If the above-mentioned polyethylene films were used for release, they are peeled off.

Example of how Composite is Used

FIG. 1(a) is a diagram illustrating an example of using the copper alloy part of the present invention in a seaplane pontoon, and FIG. 1(b) is a cross section of the pontoon when cut along the b-b line in FIG. 1(a). The pontoon 20 is one used for a small seaplane or the like. The pontoon 20 is known to be resistant to the growth of seaweed when left immersed for an extended period in seawater or fresh water. To this end, the outer surface of the pontoon 20 is covered with copper alloy sheeting 21. Lightweight and strong CFRP 22 is bonded on the inside of the copper alloy sheeting 21. Furthermore, the above-mentioned epoxy adhesive 23 is securely bonded at the boundary layer of the CFRP 22 and the copper alloy sheeting 21, which prevents the two from coming apart. Since seaweed will not adhere, the pontoon 20 is maintenance-free. Since this need to reduce the growth of seaweed is also present with the hulls of boats and so forth, the copper alloy composite of the present invention can also be used for the hulls of small boats.

As detailed above, the copper alloy composite of the present invention comprises a tightly integrated copper alloy part and FRP, and makes it possible to provide parts and structures that lightweight, have excellent properties such as electrical and thermal conductivity and seaweed resistance in seawater and fresh water, and furthermore have high mechanical strength. Industrial fields in which the copper alloy composite of the present invention can be utilized include parts used in mobile electronic devices, automotive parts, boat parts, aircraft parts, moving robot parts, and other such moving machinery parts, and structures.

BEST MODE FOR CARRYING OUT THE INVENTION

Experiment Equipment Used

Specific examples will now be given through working examples, and the following equipment was used for measurement and so forth.

(a) X-Ray Surface Observation (XPS Observation)

An ESCA "AXIS-Nova" (made by Kratos/Shimadzu) was used, of the type that looks at a surface a few microns in diameter and to a depth of 1 to 2 nm, and the constituent elements in this portion.

(b) Electron Beam Surface Observation (EPMA Observation)

An electron beam microanalyzer ("EPMA 1600" made by Shimadzu) was used, of the type that looks at a surface a few microns in diameter and to a depth of a few microns, and the constituent elements in this portion.

(c) Electron Microscope Observation

Using a SEM type of electron microscope ("JSM-6700F" made by JEOL), observations were made at 1 to 2 kV.

(d) Scanning Probe Microscope Observation

An "SPM-9600" (made by Shimadzu) was used.

(e) Measurement of Composite Joint Strength

Using a tensile tester ("Model 1323" made by Aiko Engineering), the shear breaking strength was measured at a pulling rate of 10 mm/minute.

Experiment Example 1

Copper Alloy and Adhesive

Figure 1:
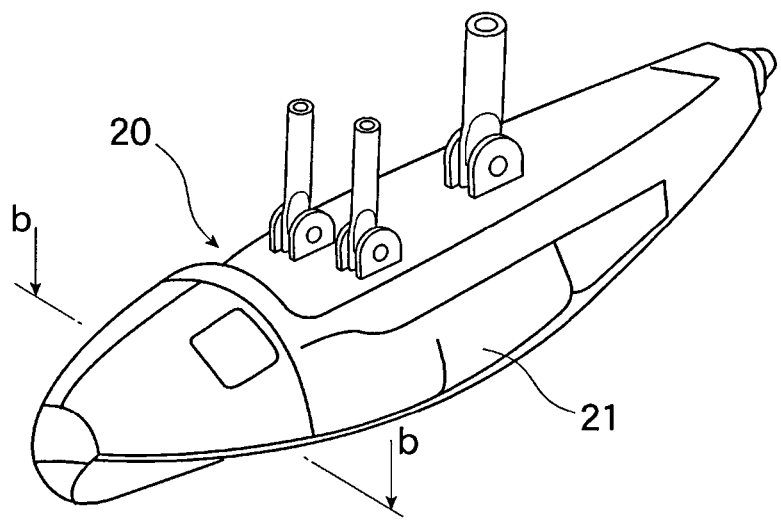
FIG. 1(a) is a diagram illustrating an example of using the composite of the present invention in a seaplane pontoon.
FIG. 1(b) is a cross section along the b-b line in FIG. 1(a)
Figure 1:
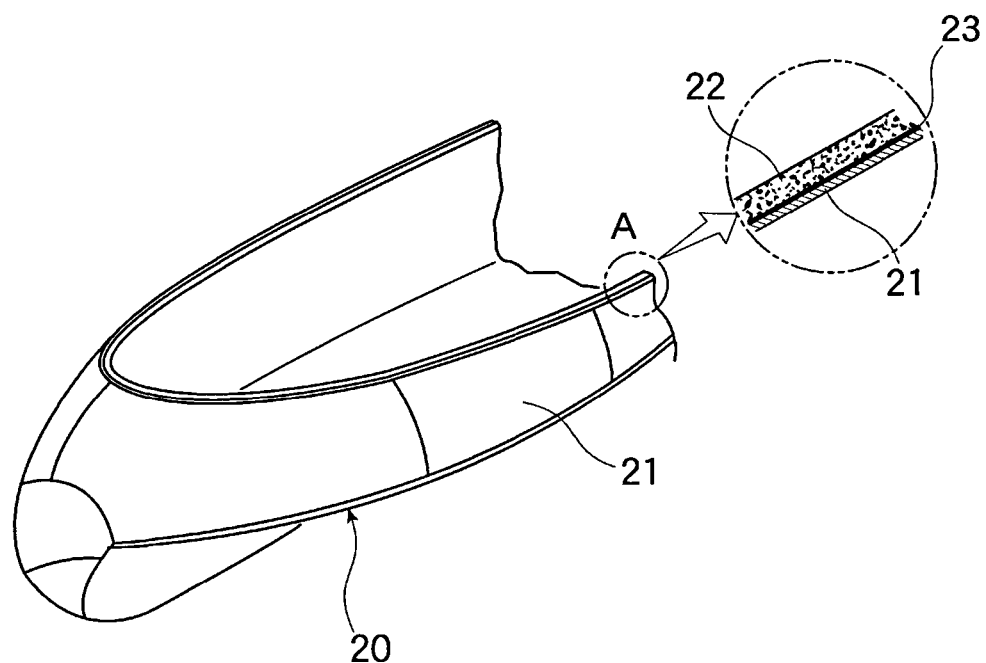
Figure 2:
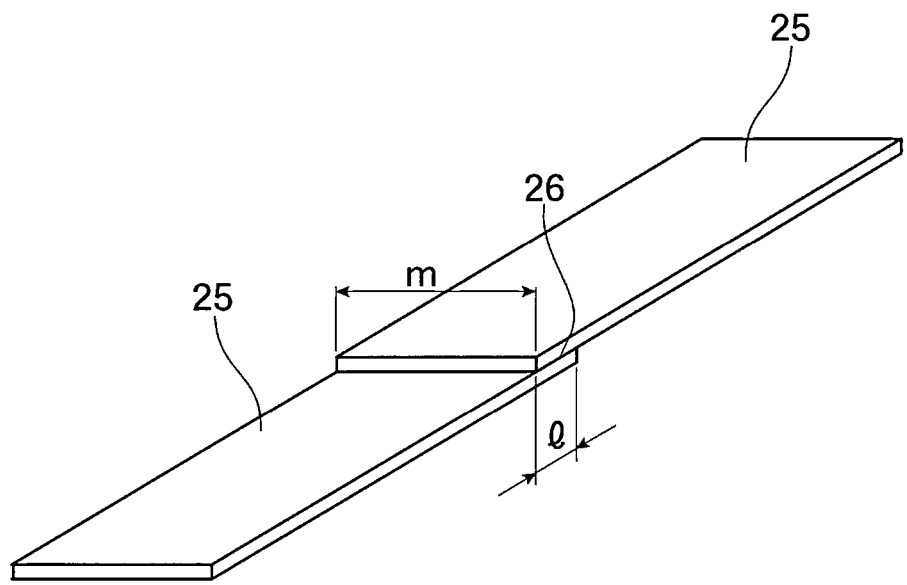
FIG. 2 is a diagram of a copper alloy piece and CFRP that have been integrated, and shows a test piece used to measure the joint strength between a copper alloy and an FRP member as the shear breaking strength.

A commercially available C1100 tough pitch copper sheeting with a thickness of 1 mm was purchased and cut into a rectangular copper alloy piece 25 measuring 45 mm×18 mm (see FIG. 2). An aqueous solution containing a commercially available aluminum alloy degreaser ("NE-6" made by Meltex) in an amount of 7.5% was adjusted to 60° C. and used as a degreaser aqueous solution, and an immersion tank was filled with it. The rectangular copper alloy piece 25 was soaked for 5 minutes in this to degrease it, and then was rinsed thoroughly with water. The copper alloy piece 25 was then soaked for 1 minute in a 1.5% caustic soda aqueous solution adjusted to 40° C. in a separate tank, and rinsed with water to perform preliminary base washing. Next, an aqueous solution containing a copper alloy etchant ("CB5002" made by MEC) in an amount of 20% and 30% hydrogen peroxide in an amount of 20% was prepared as an etching solution, and the copper alloy piece 25 that had undergone the above treatment was soaked for 10 minutes in this etching solution adjusted to 25° C., after which it was rinsed with water.

Next, in a separate tank, an aqueous solution containing caustic soda in an amount of 10% and sodium chlorite in an amount of 5% was prepared as an oxidation aqueous solution, this was adjusted to 65° C., and then the above-mentioned copper alloy piece 25 was soaked for 1 minute therein and rinsed thoroughly with water. The piece was then soaked for another minute in the previous etching aqueous solution, after which it was rinsed with water, and again soaked for 1 minute in the oxidation aqueous solution and rinsed with water. This product was dried for 15 minutes in a 90° C. hot air dryer. The dried copper alloy piece 25 was a dark reddish-brown in color. The copper alloy pieces 25 were wrapped in aluminum foil, then put in a plastic bag, sealed, and stored. For the sake of reference, the oxidation treatment was continued for 5 minutes on one piece, which turned completely black. This made it clear that the dark-colored component produced on the surface layer was cupric oxide.

Figure 9:
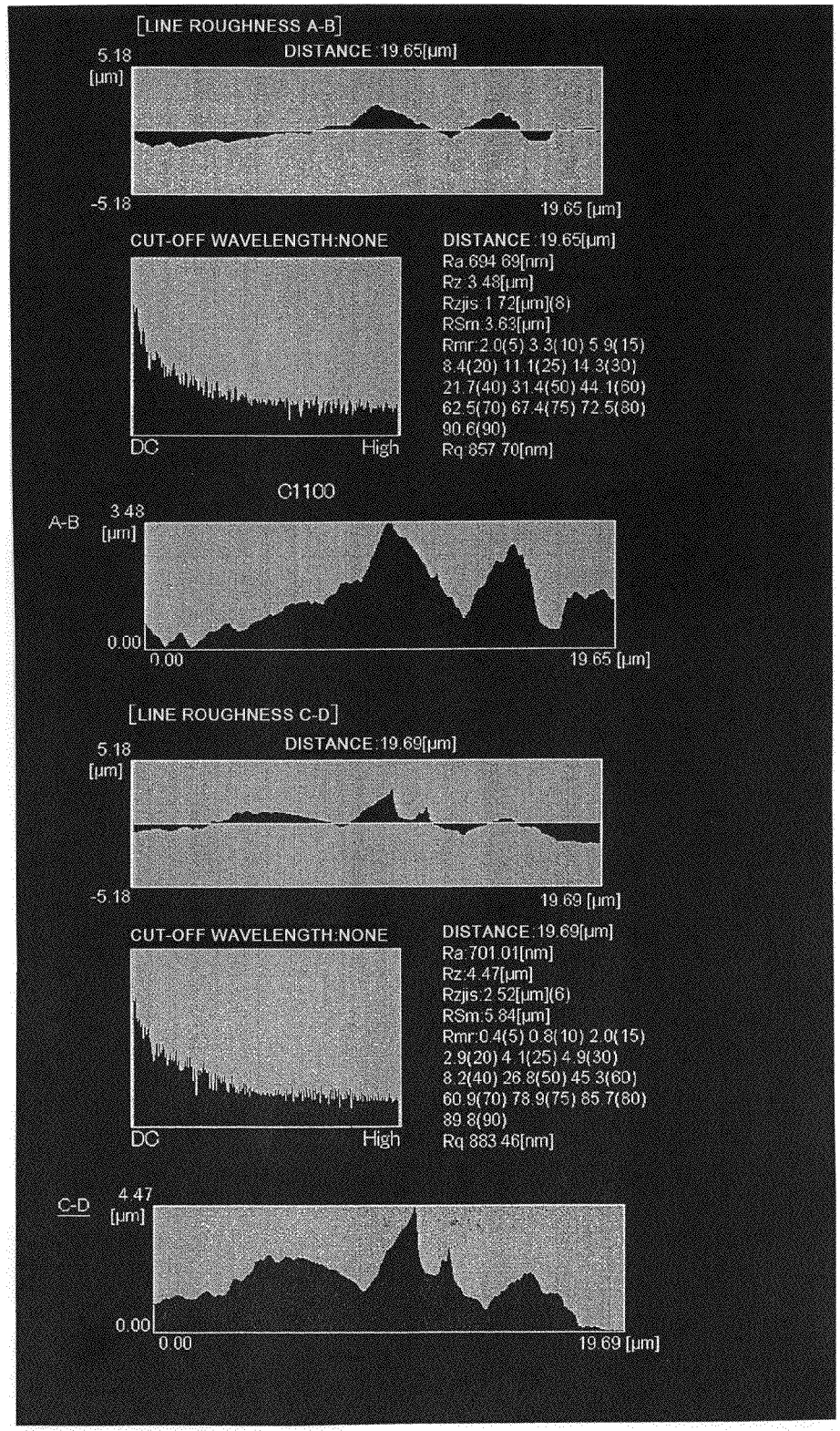
FIG. 9 is a roughness graph produced by scanning probe microscope of a test piece obtained by chemically etching a pure copper-based copper alloy C1100 (tough pitch copper) piece and subjecting it to a surface hardening treatment.

Four days later, one of the pieces was measured for roughness using a scanning probe microscope, which revealed that the peak-valley mean spacing (RSm) referred to in JIS was 3.6 µm, and the maximum roughness height (Rz) was 3.5 µm. FIG. 9 shows the results of measuring this surface roughness with a tester. The actual roughness measurement curve, as shown in FIG. 9, is gentle, in which the fine peak-valley height difference is not even 0.1 µm, whereas the surface shape was such that large valleys were present at a period of 5 to 10 µm. These large crevices looked like traces of the crystal grain boundary. It can be predicted from the data in FIG. 9 that the true RSm is a number between 6 and 10 µm, and the RSm value obtained by scanning analysis with this scanning microscope (mean length of roughness curve) does not express the real situation. In analysis by scanning probe microscope (performed by the attached computer), it was clear that the small period of height difference of less than 0.1 µm was not well employed in the analysis of this data.

Figure 5:
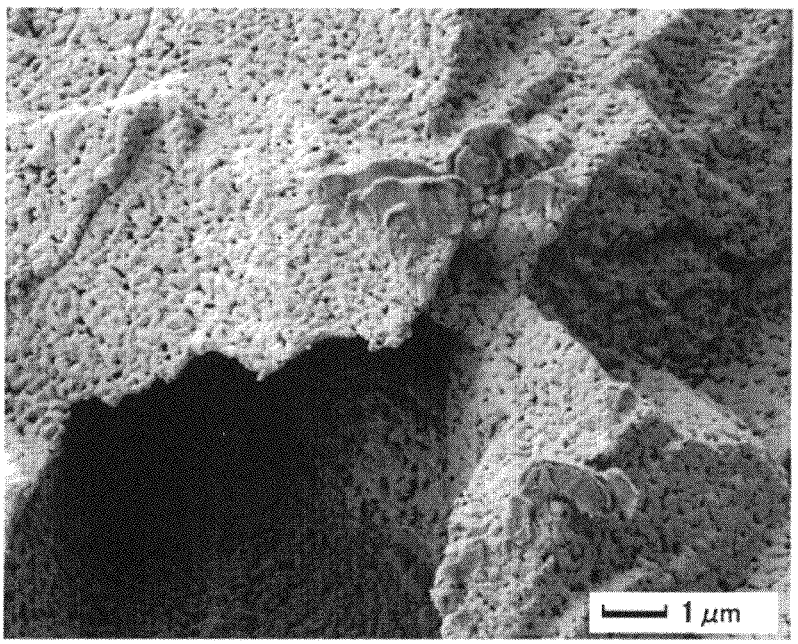
FIG. 5 consists of 10,000 and 100,000 power electron micrographs of a C1100 copper alloy piece that has been chemically etched and subjected to a surface hardening treatment.
Figure 5:
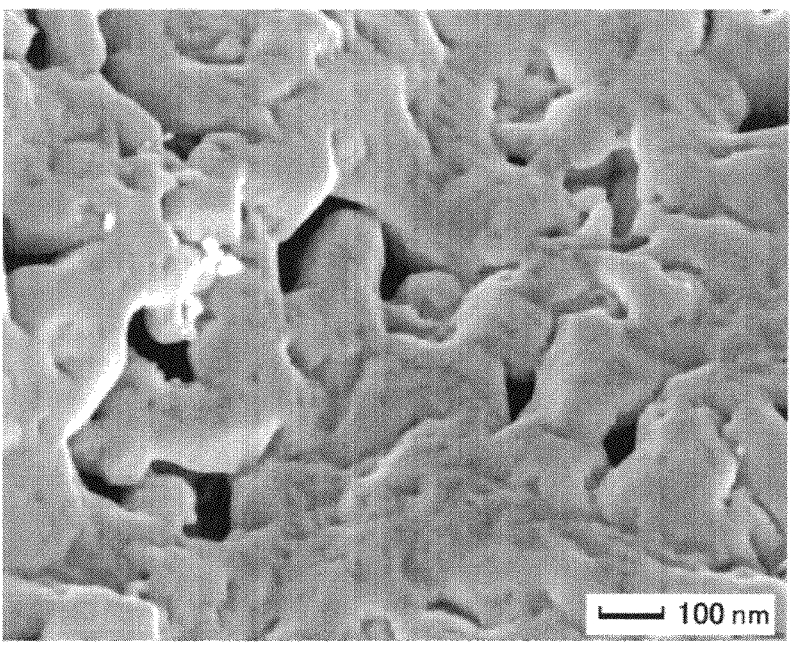

Meanwhile, the maximum roughness height Rz indicated the correct measured value. Consequently, when measurements were made again with a conventional roughness gauge, the RSm measured at a length of 500 µm came out as 8.1 µm. In the end, the roughness of the surface is determined by the sharpness of the measurement end and the data processing method, so if the data is judged to be abnormal, the only thing to do is make a decision from the data and a micrograph taken by electron microscope. Specifically, when the same object is observed by electron microscope at 10,000 and 100,000 power, a relatively gentle hill shape in which there are numerous openings (depressions) is observed. These openings are such that the diameter of the circle, or the average of the major and minor diameters of an ellipse, is 20 to 150 nm, and the period at which these openings are present is 100 to 300 nm. These openings correspond to fine texturing, and a single hill made by this fine textured surface seems to correspond to a single crystal grain as seen with a probe microscope. FIG. 5 is a photograph of this.

The same day the copper alloy piece 25 was taken out, it was thinly coated at the end with a commercially available liquid-liquid amine curing type of epoxy adhesive ("EP-106" made by Cemedine). The piece was placed in a desiccator with the coated side up, the pressure was reduced to 3 mmHg with a vacuum pump, and after standing for 1 minute, air was let in to return to normal pressure. The cycle of reduced pressure and returning to normal pressure was repeated three times, and the piece was taken out of the desiccator. The two ends coated with the adhesive 26 were put together, and two copper alloy pieces were obtained as shown in FIG. 2. The joined surface area (1×m) at the two ends of the alloy pieces 25 was about 0.5 cm². These pieces were put in a hot air dryer adjusted to 120° C. and heated with a 300 g weight placed on the two overlapped copper alloy pieces. After 40 minutes of this heating, the temperature setting of the hot air dryer was changed to 150° C., and after the temperature had risen to 150° C., the pieces were left for 20 minutes, then the hot air dryer was switched off and the door was left open while the pieces cooled. The product had the shape shown in FIG. 2. Two days later a tensile breaking test was conducted, in which the shear breaking strength as an average of 4 sets was 36 MPa, which means the bond was extremely strong.

Experiment Example 2

Copper Alloy and Adhesive

The etching aqueous solution was changed to 98% sulfuric acid in an amount of 5%, aqueous hydrogen peroxide with a concentration of 30% in an amount of 20%, and deionized water in an amount of 75%, but everything else was exactly the same as in Experiment Example 1. The adhesive bonding was also carried out in an exactly the same manner as in Experiment Example 1, and the shear breaking strength as an average of 4 sets was 34 MPa.

Experiment Example 3

Copper Alloy and Adhesive

A commercially available C1020 oxygen-free copper sheeting with a thickness of 1 mm was used and cut to the same size as in Experiment Example 1. An aqueous solution containing a commercially available aluminum alloy degreaser ("NE-6" made by Meltex) in an amount of 7.5% was adjusted to 60° C. and used as a degreaser aqueous solution. The copper alloy piece 25 was soaked for 5 minutes in this to degrease it, and then was rinsed thoroughly with water. The copper alloy piece 25 was then soaked for 1 minute in a 1.5% caustic soda aqueous solution adjusted to 25° C. in a separate tank, and rinsed with water to perform preliminary base washing. Next, an aqueous solution containing a copper alloy etchant ("CB5002" made by MEC) in an amount of 20% and 30% hydrogen peroxide in an amount of 20% was prepared as an etching solution, and the copper alloy piece 25 that had undergone the above treatment was soaked for 15 minutes and then rinsed with water. Next, an aqueous solution containing caustic soda in an amount of 10% and sodium chlorite in an amount of 5% was prepared as an oxidation aqueous solution in a separate tank, this was adjusted to 65° C., and then the above-mentioned alloy sheeting was soaked for 1 minute therein and rinsed thoroughly with water.

Figure 6:
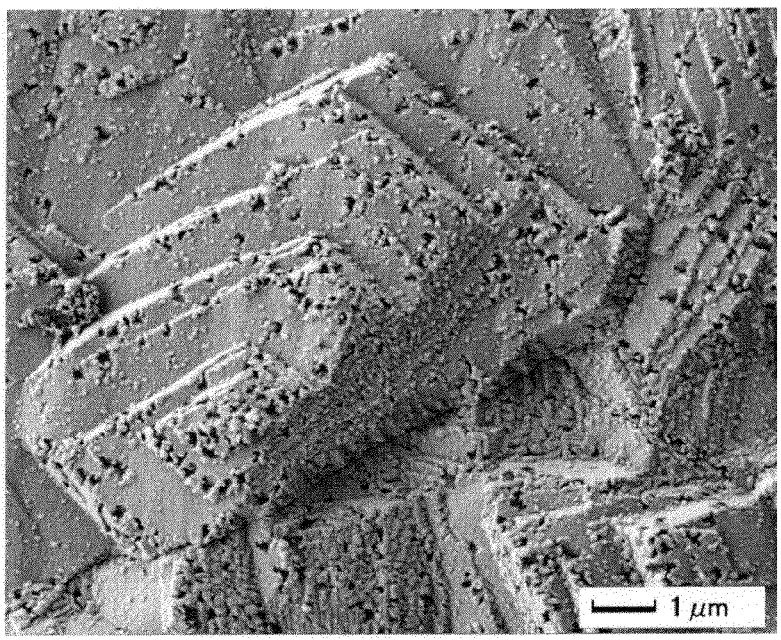
FIG. 6 consists of 10,000 and 100,000 power electron micrographs of a C1020 copper alloy piece that has been chemically etched and subjected to a surface hardening treatment.
Figure 6:
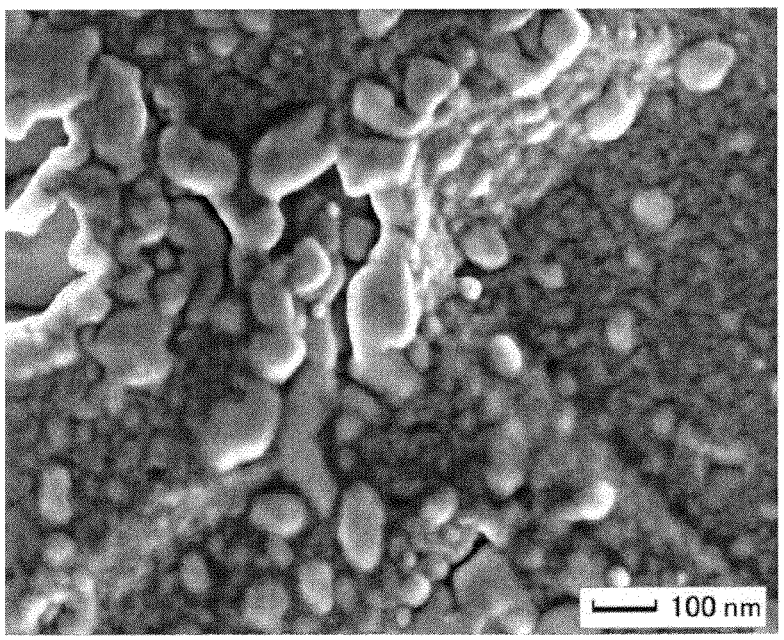

The piece was then soaked for another minute in the previous etching aqueous solution, after which it was rinsed with water, and again soaked for 1 minute in the oxidation aqueous solution and rinsed with water. This product was dried for 15 minutes in a 90° C. hot air dryer. The dried copper alloy piece 25 was a dark reddish-brown in color. The copper alloy pieces 25 were wrapped in aluminum foil, then put in a plastic bag, sealed, and stored. FIG. 6 shows the results of electron microscope observation. As is clear from the 100,000 power micrograph, unlike the micrograph in FIG. 5, the convex parts were more noticeable than the concave parts, and there was an ultrafine texturing shape in which granules with a diameter of 10 to 200 nm were mixed together and present over the entire surface.

Figure 10:
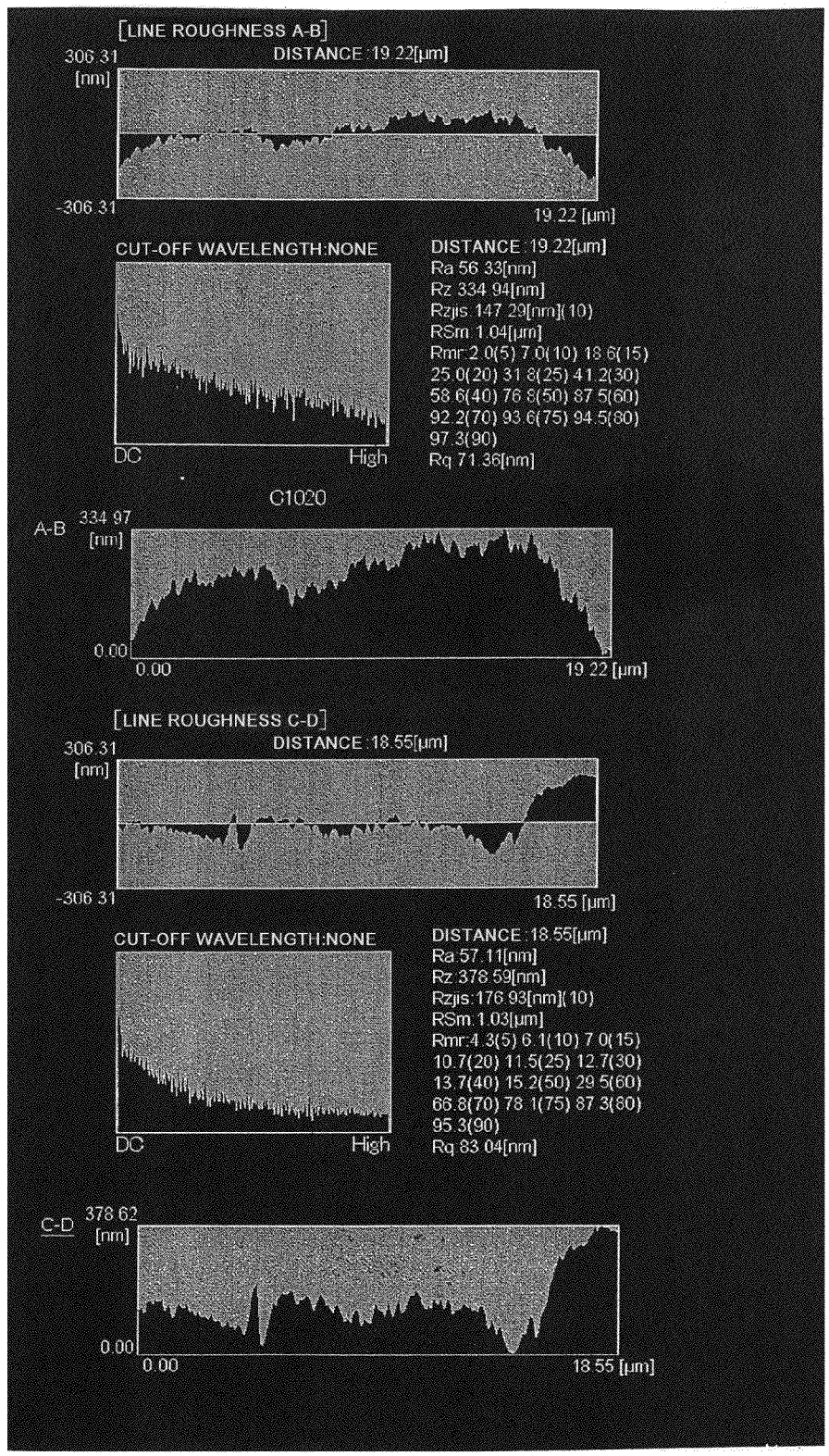
FIG. 10 is a roughness graph produced by scanning probe microscope of a test piece obtained by chemically etching a pure copper-based copper alloy C1020 (oxygen-free copper) piece and subjecting it to a surface hardening treatment.

Also, the numerical value related to roughness measured with a scanning probe microscope, that is, the peak-valley mean spacing (RSm) referred to in JIS, was 1.0 μm, and the maximum roughness height (Rz) was 0.38 μm. These numbers, however, did not express the true state, just as in Experiment Example 1. Specifically, the roughness curve obtained by probe microscope is shown in FIG. 10, in which the value of Rz indicates the depth formed by large, gentle valleys with a period of about 10 μm as shown, while the peak-valley mean spacing RSm can be seen to be a vague number that also picks up the fine period. If a period demarcated by large, gentle valleys is found from FIG. 10, it will be 7 to 13 μm. When measurements were made again with a conventional roughness gauge, RSm was calculated to be 10 μm, and Rz was 0.4 μm.

After this, in exactly the same manner as in Experiment Example 1, the ends was thinly coated with a commercially available liquid-liquid amine curing type of epoxy adhesive ("EP-106" made by Cemedine), the piece was placed in a desiccator and subjected to the same treatment, two sides coated with the adhesive were put together, and the coating was cured in a hot air dryer. A tensile breaking test was conducted two days layer, in which the shear breaking strength as an average of 4 sets was 36 MPa, which means the bond was extremely strong.

Experiment Example 4

Copper Alloy and Adhesive

A commercially available iron-based copper alloy sheeting with a thickness of 0.7 mm ("KFC" made by Kobe Steel) was purchased and cut into numerous rectangular pieces measuring 45 mm×18 mm. An aqueous solution containing a commercially available aluminum alloy degreaser ("NE-6" made by Meltex) in an amount of 7.5% was adjusted to 60° C. and used as a degreaser aqueous solution. The copper alloy piece 25 was soaked for 5 minutes in this to degrease it, and then was rinsed thoroughly with water. The copper alloy piece 25 was then soaked for 8 minutes in an aqueous solution containing a copper alloy etchant ("CB5002" made by MEC) in an amount of 20% and 30% hydrogen peroxide in an amount of 18% in a separate tank, and then rinsed with water.

Next, an aqueous solution containing caustic soda in an amount of 10% and sodium chlorite in an amount of 5% was prepared as an oxidation aqueous solution in a separate tank, this was adjusted to 65° C., and then the above-mentioned alloy sheeting was soaked for 1 minute therein and rinsed thoroughly with water. The piece was then soaked for another minute in the previous etching aqueous solution, after which it was rinsed with water, and again soaked for 1 minute in the oxidation aqueous solution and rinsed thoroughly with water. This product was dried for 15 minutes in a 90° C. hot air dryer. The dried copper alloy piece was a dark reddish-brown in color. The copper alloy pieces were wrapped in aluminum foil, then put in a plastic bag, sealed, and stored.

Figure 7:
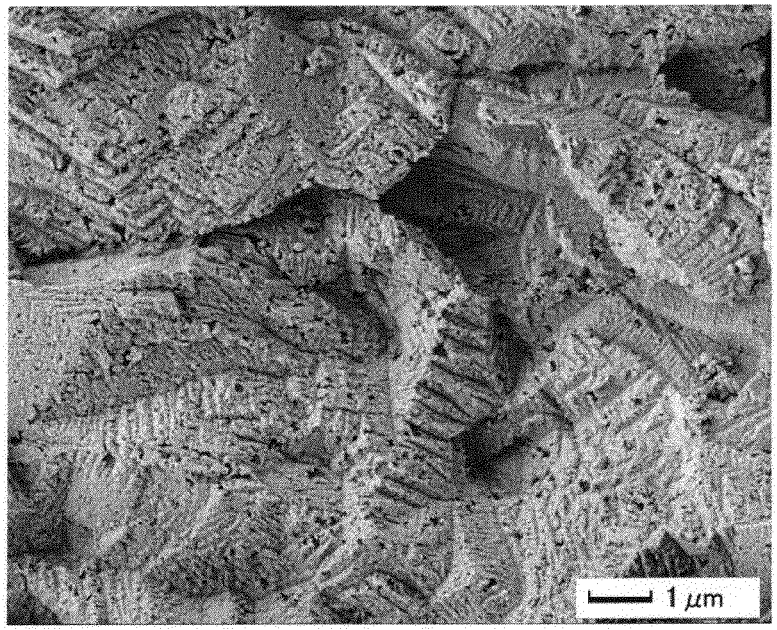
FIG. 7 consists of 10,000 and 100,000 power electron micrographs of a test piece obtained by chemically etching an iron-based copper alloy ("KFC" made by Kobe Steel) piece and subjecting it to a surface hardening treatment.
Figure 7:
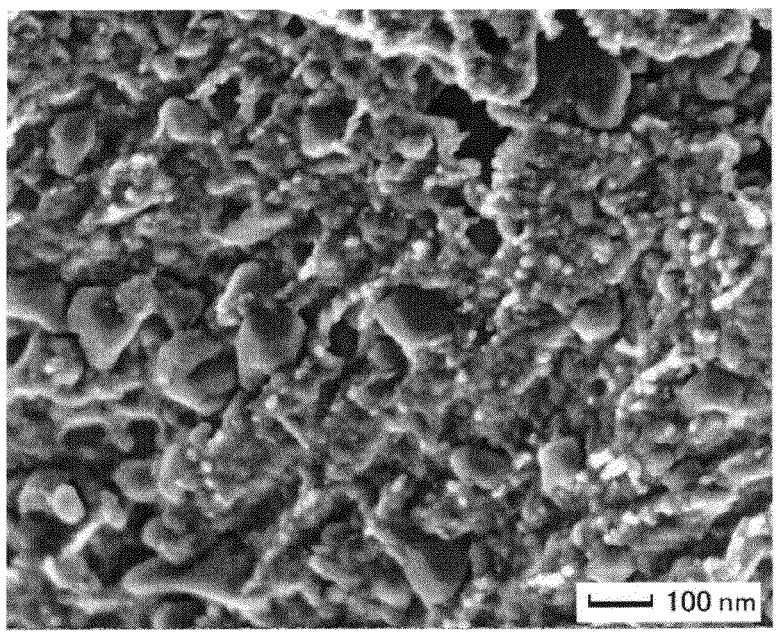
Figure 11:
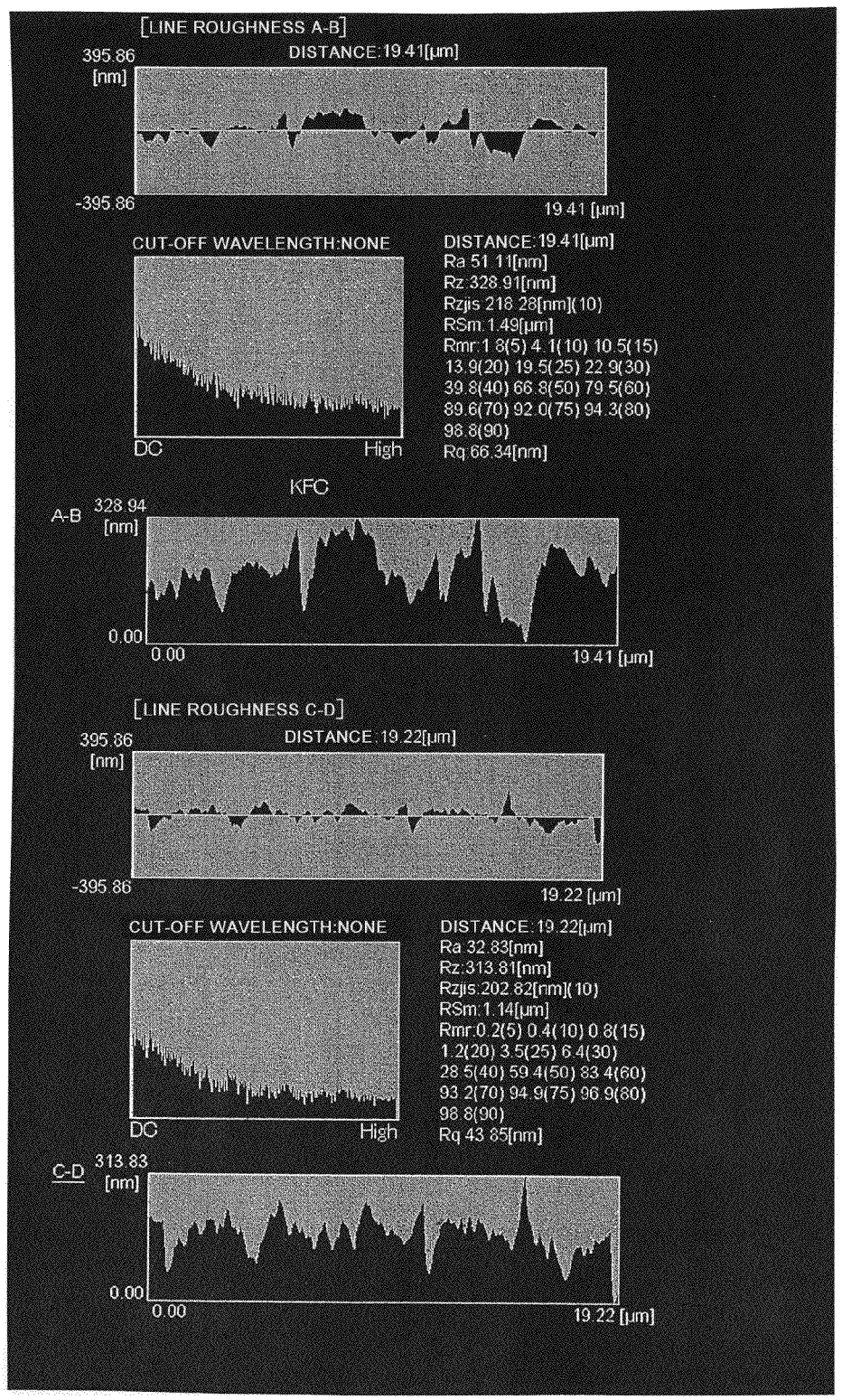
FIG. 11 is a roughness graph produced by scanning probe microscope of a test piece obtained by chemically etching an iron-containing copper alloy ("KFC" made by Kobe Steel) piece and subjecting it to a surface hardening treatment.

After four days of this storage, one of the pieces was put under a scanning probe microscope. The result is shown in FIG. 11. The peak-valley mean spacing (RSm) referred to in JIS was 1.5 μm, and the maximum roughness height (Rz) was 0.32 μm. Observation by 100,000 power electron microscope revealed that the entire surface was covered by ultrafine texturing in which granules with a diameter of 10 to 20 nm and large amorphous polygons with a diameter of 50 to 150 nm were mixed together and in a stacked shape, similar in form to the gullies on the slope of a lava plateau. FIG. 7 is a micrograph of this.

The same day the copper alloy piece was taken out, it was thinly coated at the end with a commercially available liquid-liquid amine curing type of epoxy adhesive ("EP-106" made by Cemedine). The piece was placed in a desiccator with the coated side up, the pressure was reduced to 3 mmHg with a vacuum pump, and after standing for 1 minute, air was let in to return to normal pressure. The cycle of reduced pressure and returning to normal pressure was repeated three times, and the piece was taken out of the desiccator. The two ends coated with the adhesive were put together, and the joined surface area was about 0.5 cm$^2$. These pieces were put in a hot air dryer adjusted to 120° C. and heated with a 300 g weight placed on the two overlapped copper alloy pieces. After 40 minutes of heating at 120° C., the temperature setting of the hot air dryer was changed to 150° C., and after the temperature had risen to 150° C., the pieces were left for 20 minutes, then the hot air dryer was switched off and the door was left open while the pieces cooled. Two days later a tensile breaking test was conducted, in which the shear breaking strength as an average of 4 sets was 40.5 MPa, which means the bond was extremely strong.

Experiment Example 5

Copper Alloy and Adhesive

A commercially available JIS phosphor bronze type 2 (C5191) sheeting with a thickness of 1 mm was purchased and cut into numerous rectangular pieces measuring 45×18 mm. An aqueous solution containing a commercially available aluminum alloy degreaser ("NE-6" made by Meltex) in an amount of 7.5% was adjusted to 60° C. in a tank and used as a degreaser aqueous solution. The above-mentioned copper alloy piece was soaked for 5 minutes in this to degrease it, and then was rinsed thoroughly with water. The copper alloy piece was then soaked for 15 minutes in an aqueous solution adjusted to 25° C. and containing a copper alloy etchant ("CB5002" made by MEC) in an amount of 20% and 30% hydrogen peroxide in an amount of 18% in a separate tank, and then rinsed with water. Next, an aqueous solution containing caustic soda in an amount of 10% and sodium chlorite in an amount of 5% was prepared as an oxidation aqueous solution in a separate tank, this was adjusted to 65° C., and then the above-mentioned alloy sheeting was soaked for 1 minute therein and rinsed thoroughly with water.

Figure 8:
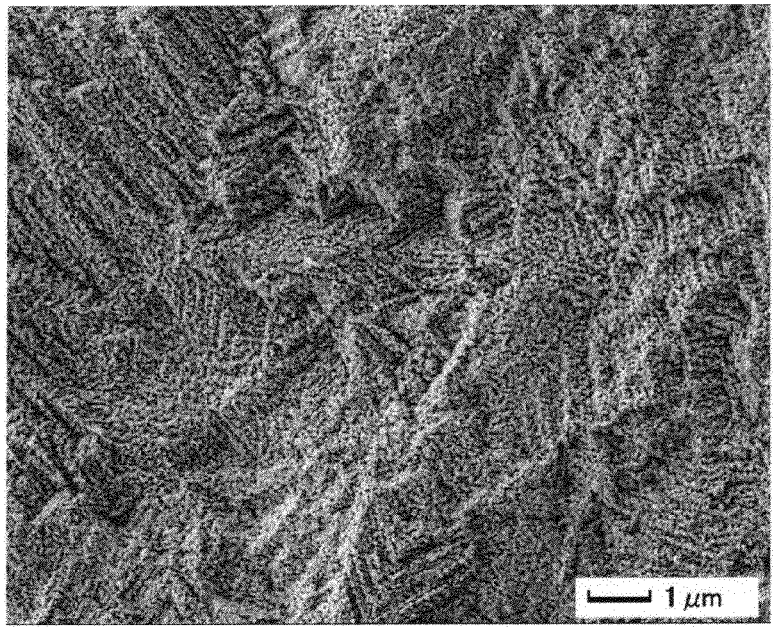
FIG. 8 consists of 10,000 and 100,000 power electron micrographs of a test piece obtained by chemically etching a JIS phosphor bronze type 2 (C5191) copper alloy piece and subjecting it to a surface hardening treatment.
Figure 8:
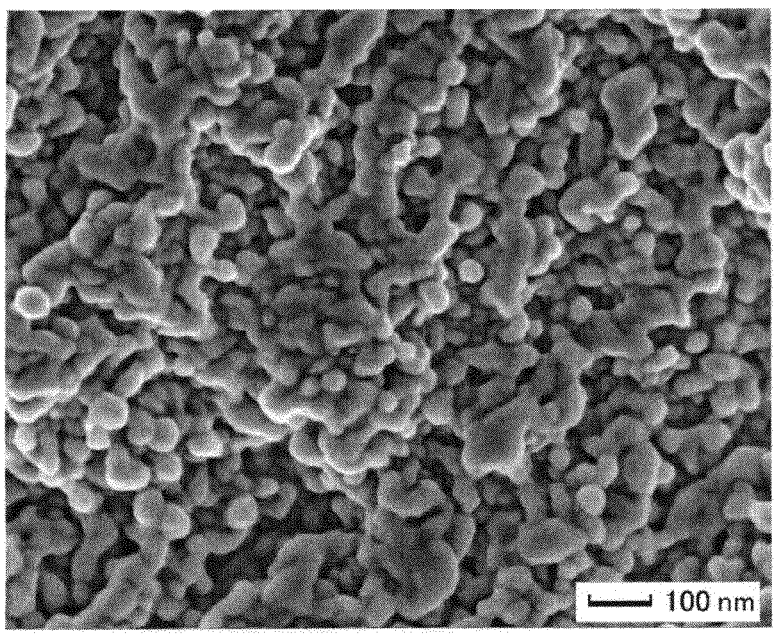

The piece was then soaked for another minute in the previous etching aqueous solution, after which it was rinsed with water, and again soaked for 1 minute in the oxidation aqueous solution and rinsed thoroughly with water. This product was dried for 15 minutes in a 90° C. hot air dryer. The dried copper alloy piece was a dark reddish-brown in color. The copper alloy pieces were wrapped in aluminum foil, then put in a plastic bag, sealed, and stored. Four days later, observation by electron microscope revealed that substantially the entire surface was covered with ultrafine texturing in which granules or amorphous polygons with a diameter of 10 to 150 nm that are lined up and partially melted together in a stacked shape. FIG. 8 is a micrograph of this ultrafine texturing. After this, the C5191 phosphor bronze pieces were bonded together and subjected to a tensile breaking test in exactly the same manner as in Experiment Example 4. The shear breaking strength as an average of 4 sets was 46 MPa, which means the bond was extremely strong.

Experiment Example 6

Copper Alloy and Adhesive

A commercially available connector-use copper alloy sheeting with a thickness of 0.4 mm ("KLF5" made by Kobe Steel) was purchased and cut into numerous rectangular pieces measuring 45 mm×18 mm. The liquid treatment method was exactly the same as in Experiment Example 4. As seen from the results of electron microscope observation, there was fine texturing in which convex components with a diameter of 10 to 150 nm completely filled in the surface, and the spacing between the convex components was noted to be extremely short, about 10 nm. The experiment for adhesive bonding was also conducted in the same manner as in Experiment Example 4. The tensile breaking test was also conducted in the same manner as in Experiment Example 4, and while it was only breaking data that was difficult to theorize, whose starting point was separation due to moment breakage, and the sheeting was thin, a numerical value of 36 MPa was obtained.

Experiment Example 7

Copper Alloy and Adhesive

A commercially available large connector-use copper alloy sheeting with a thickness of 0.8 mm ("CAC16" made by Kobe Steel) was purchased and cut into numerous rectangular pieces measuring 45 mm×18 mm. The liquid treatment method was exactly the same as in Experiment Example 4. As seen from the results of electron microscope observation, there was fine texturing in which convex components with a diameter of 10 to 100 nm completely filled in the surface, and the spacing between the convex components was noted to be extremely short, about 10 nm, but a special shape of partially acute film form was also present. The above-mentioned ultrafine texturing covered 99% of the surface, though. The adhesive bonding experiment was the same as in Experiment Example 4. The tensile breaking test was also conducted in the same manner as in Experiment Example 4. The shear breaking strength was 43 MPa.

Experiment Example 8

Copper Alloy and Adhesive

A commercially available large connector-use copper alloy sheeting with a thickness of 0.4 mm ("KLF194" made by Kobe Steel) was purchased and cut into numerous rectangular pieces measuring 45 mm×18 mm. The liquid treatment method was exactly the same as in Experiment Example 4. As seen from the results of electron microscope observation, granules with a diameter of 10 to 100 nm completely filled in the surface, with a spacing of about 10 nm, but in a 10,000 powder electron micrograph, it can be seen that the areas around the large granules are actually concave, so it could be said that countless concave components of 10 to 100 nm in diameter cover the surface. The adhesive bonding experiment was the same as in Experiment Example 4. The tensile breaking test was also conducted in the same manner as in Experiment Example 4, and while it was only breaking data that was difficult to theorize, whose starting point was separation due to moment breakage, and the sheeting was thin, a numerical value of 32 MPa was obtained.

Experiment Example 9

Production of Prepreg

A prepreg is a molding intermediate material in the form of a sheet in which a weave of carbon, glass, or the like is permeated with a thermosetting resin, and when it is heated and cured, it produces a light yet strong fiber-reinforced plastic (FRP). In Experiment Example 9, a thermosetting resin composed of the components shown in the following Table 1 was used to make this prepreg.

TABLE 1

| Thermosetting resin used for prepreg | | |
|---|---|---|
| | Resin components | Amount (weight parts) |
| Epoxy resin | brominated bisphenol A-type solid epoxy resin ("EPC-152" made by Dainippon Ink & Chemicals) | 10.0 |
| | bisphenol A-type liquid epoxy resin ("EP- | 13.9 |

TABLE 1-continued

Thermosetting resin used for prepreg

| Resin components | | Amount (weight parts) |
|---|---|---|
| Elastomer | 828" made by Yuka Shell Epoxy) bisphenol F-type liquid epoxy resin ("EPC-830" made by Dainippon Ink & Chemicals) | 24.8 |
| | weakly crosslinkable carboxyl group-terminated solid acrylonitrile butadiene rubber ("DN-611" made by Nippon Zeon) | 8.0 |
| | thermoplastic resin, hydroxyl group-terminated polyether sulfone ("PES-100P" made by Mitsui Toatsu Chemical) | 3.0 |
| Curing agent | | |
| tetraglycidyldiaminodiphenylmethane ("ELM-434" made by Sumitomo Chemical) | | 15.0 |
| 4,4'-diaminodiphenylsulfone ("4,4'-DDS' made by Sumitomo Chemical) | | 25.0 |
| $BF_3$ monoethylamine complex ("BF3•MEA") | | 0.3 |
| Total | | 100.0 |

The thermosetting resin components shown in Table 1 were mixed with a roll at normal temperature and made into a sheet. The thermosetting resin film thus obtained was placed in a prepreg machine and pressed by a standard method from both sides of carbon fiber ("T-300" made by Toray) aligned in a single direction as reinforcing fiber, which gave a prepreg adjusted to a resin content of 38%. The fiber basis weight was 190 g/m².

Experiment Example 10

Adhesive Agent

A common, commercially available liquid-liquid dicyandiamide curing type of epoxy adhesive ("EP-106" made by Cemedine) was purchased. Meanwhile, an ethylene-acrylic acid ester-maleic anhydride ternary copolymer ("Bondine TX8030" made by Arkema), which is a polyolefin resin, was purchased and freeze-dried and pulverized at the temperature of liquid nitrogen, which gave a powder of 30 μm pass. Also, glass fiber with an average fiber diameter of 9 μm and a fiber length of 3 mm ("RES03-TP91" made by Nippon Sheet Glass) was purchased and lightly pulverized in a mortar. 100 g of "EP-106" epoxy adhesive, 5 g of the above-mentioned powdered polyolefin resin, and 10 g of the above-mentioned glass fiber were put in a polyethylene beaker and thoroughly stirred, allowed to stand for 1 hour, and then stirred again to mix well. This was termed an epoxy adhesive composition. The adhesive composition thus obtained was used in place of the "EP-106," but everything else was conducted in exactly the same manner as in Experiment Example 1. A tensile breaking test was conducted two days after the adhesive was cured, and the shear breaking strength as an average of 4 sets was 38 MPa.

Experiment Example 11

Adhesive Agent

A common, commercially available epoxy adhesive ("EP-106") was purchased. Meanwhile, a glycidyl methacrylate-ethylene copolymer ("Bondfast E" made by Sumitomo Chemical), which is a polyolefin resin, was purchased and freeze-dried and pulverized at the temperature of liquid nitrogen, which gave a powder of 30 μm pass. 100 g of "EP-106" epoxy adhesive, 5 g of the above-mentioned powdered polyolefin resin, and 10 g of the "RES03-TP91" glass fiber were put in a polyethylene beaker and thoroughly stirred, allowed to stand for 1 hour, and then stirred again to mix well. This was termed an epoxy adhesive composition. The adhesive composition thus obtained was used in place of the "EP-106," but everything else was conducted in exactly the same manner as in Experiment Example 1. A tensile breaking test was conducted two days after the adhesive was cured, and the shear breaking strength as an average of 4 sets was 36 MPa.

It is clear from looking at the results of this experiment example and Experiment Examples 1 and 10 that the basic bonding strength is determined by the shape and properties of the metal surface. Specifically, the fact that the results in this example were substantially the same as those in Experiment Examples 1 and 10 seems to indicate that the basic performance of the adhesive itself is no different between this example and with "EP-106." In fact, since the adhesive of this example contains an elastomer, and the coefficient of linear expansion should be close to that of the metal because of the filler admixture, it was anticipated, based on conventional wisdom, that a good effect would be obtained after undergoing vibration or after undergoing a high temperature. This is common sense to researchers at the forefront of adhesive chemistry.

Experiment Example 12

Production of Composite, and Evaluation Thereof

A C1100 copper alloy piece with a thickness of 1 mm was cut into numerous rectangular pieces measuring 45 mm×15 mm. Liquid treatment was performed in exactly the same manner as in Experiment Example 1. Specifically, the piece was degreased with an "NE-6" aluminum alloy degreaser aqueous solution, then subjected to preliminary base washing with a caustic soda aqueous solution with a concentration of 1.5%, and then etched with a copper etching aqueous solution, oxidized with an aqueous solution containing caustic soda and sodium chlorite, then soaked for 1 minute in the copper etching solution, rinsed with water, and then re-oxidized by being soaked for another minute in an oxidation aqueous solution. This product was dried for 15 minutes in a 90° C. hot air dryer. After drying, the above-mentioned copper alloy sheets were wrapped together in aluminum foil and stored.

The same day the copper alloy piece that had undergone the above-mentioned treatment was taken out, it was thinly coated at the end with a commercially available liquid-liquid dicyandiamide curing type of epoxy adhesive ("EP-106" made by Cemedine). The piece was placed in a desiccator with the coated side up, the pressure was reduced to 3 mmHg with a vacuum pump, and after standing for 1 minute, air was let in to return to normal pressure. The cycle of reduced pressure and returning to normal pressure was repeated three times, and the piece was taken out of the desiccator.

Baking Jig 1

Figure 3:
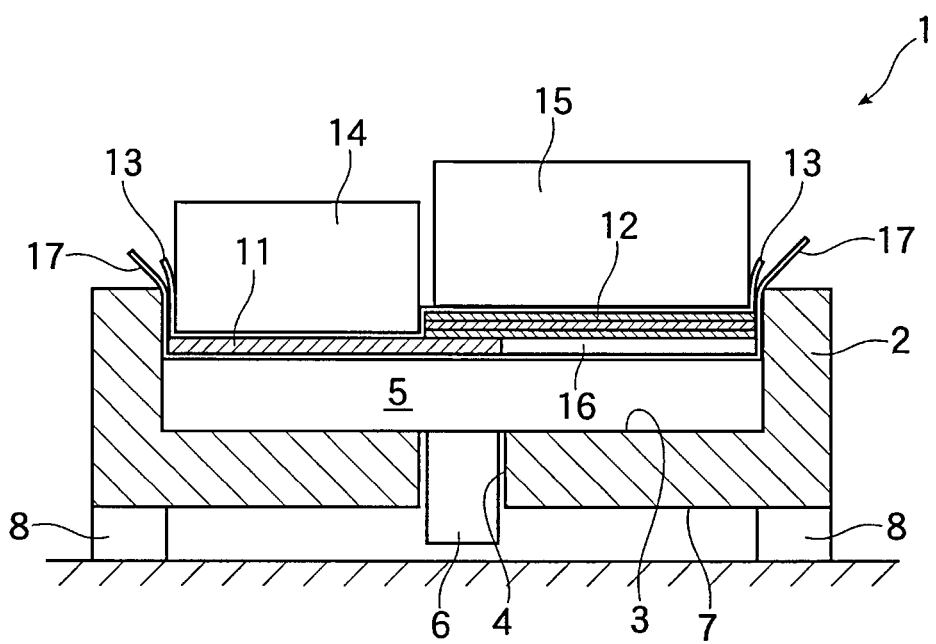
FIG. 3 is a cross section of a baking jig used for bonding a copper alloy piece and an FRP.
Figure 4:
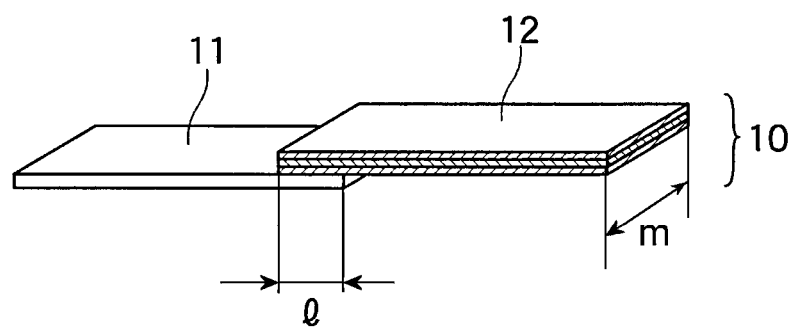
FIG. 4 is a diagram of a test piece used in a tensile breaking test of a copper alloy piece produced by baking a copper alloy piece and a CFRP.

FIG. 3 is a cross section of a baking jig for baking to bond a copper alloy sheet and an FRP. FIG. 4 is a diagram of an integrated product 10 of a copper alloy piece 11 and a CFRP 12, produced by baking the copper alloy sheet and the CFRP in this baking jig 1. The baking jig 1 is used to fix the copper alloy piece 11 and the prepreg 12 when they are being baked. A mold main body 2 is open on the top side, and a rectangular mold depression 3 is formed. In the bottom of this is formed a mold through-hole 4, which is a hole that goes all the way through.

A bottom plate protrusion 6 of a mold bottom plate 5 was inserted into the mold through-hole 4. The bottom plate protrusion 6 stuck out from a mold bottom plate 7 of the mold main body 2. The bottom of the mold main body 2 was placed over a mold seat 8. The baking jig 1 was such that the copper alloy piece 10 produced by joining the copper alloy piece 11 and the CFRP 12 as shown in FIG. 4 was baked and manufactured in a state in which the mold bottom plate 5 had been inserted into the mold depression 3 of the mold main body 2. In short, this copper alloy piece composite 10 was manufactured by the following procedure. First, a releasing film 17 was spread out over the entire top face of the mold bottom plate 5. The copper alloy piece 11 and a flat PTFE spacer 16 were placed over the releasing film 17.

Three to five sheets of fabric of carbon fiber (T-300 (Toray)) 12 that had been cut to the required size and produced by regular weaving were layered over the PTFE spacer 16 made of PTFE (polytetrafluoroethylene resin) and over the end of the copper alloy piece 11. The carbon fiber weave 12 was impregnated with uncured epoxy adhesive (EP-106) by injecting a volume of approximately 1 cc from an injector. This produced an uncured CFRP prepreg.

After the layering of this prepreg 12, a releasing film 13 (a polyethylene film used for release) was further layered over the copper alloy piece 11 and the prepreg 12. Over this were placed PTFE blocks 14 and 15 that were made of PTFE and used as weights. If needed, a weight (not shown) of a few hundred grams may also be placed. In this state, everything was put into a baking oven and the prepreg was cured and allowed to cool, after which the weight, the seat 8, and so forth were removed, and the bottom end of the bottom plate protrusion 6 was pressed against the floor, which removed the releasing films 13 and 17 as well as the copper alloy composite 10 (see FIG. 4) of the copper alloy piece 11 and the CFRP. The PTFE spacer 16 and the releasing films 17 and 13 can be easily peeled away from the CFRP, because they are made of non-stick material.

Further, the prepreg 12 and the copper alloy piece 11 were inserted into place inside the baking jig 1 by the procedure discussed above, the PTFE blocks 14 and 15 were placed over these, and everything was put in a hot air dryer. Here, iron weights of 0.5 kg each were placed on the PTFE blocks 14 and 15, power was turned on to the hot air dryer (baking oven), and the temperature was raised to 135° C. Heating was performed at 135° C. for 40 minutes, then the temperature was raised to 165° C. over a period of 5 minutes, held for 20 minutes at 165° C., and then the power was shut off and the contents were allowed to cool with the door left shut. The product was taken out of the hot air dryer the next day, the copper alloy composite 10 was released from the baking jig 1, and the releasing polyethylene film was peeled away to obtain an object in the shape shown in FIG. 4. The same operation was repeated to obtain eight integrated products.

Two days after the joining of the copper alloy composite 10, four of the pieces were subjected to a tensile breaking test to measure the shear strength of the joined portion of the copper alloy piece 11 and the CFRP 12. The CFRP portion was sandwiched between two pieces of SUS 304 stainless steel with a thickness of 1 mm and that had been sanded with sandpaper, and this was clamped in a chuck. The shear breaking strength of the four sets on average was 38 MPa, which was extremely strong. As shown in FIG. 2, the joint surface area was calculated as l×m. Next, the remaining four pieces were clamped in a tensile tester in the same manner as above, the pulling was halted at the point when approximately 20 MPa had been reached, the pieces were left for 10 minutes like this, and then the chuck was loosened and the pieces removed from the tester and allowed to rest. The next day, when these pieces were subjected to a tensile breaking test, the result was 40 MPa on average, with no particular decrease in joint strength being noted.

Experiment Example 13

Production of Composite, and Evaluation Thereof

A C1100 copper alloy piece with a thickness of 1 mm was cut into rectangular pieces measuring 45 mm×15 mm just as in Experiment Example 12, and the same adhesive strength measurement test pieces were produced. Specifically, the copper alloy piece 11 was coated with an adhesive agent and put in a desiccator, the cycle of reducing pressure with a vacuum pump and returning to normal pressure, etc., was repeated three times, and a copper alloy piece that had been coated with an adhesive was prepared. Next, the baking mold 1 shown in FIG. 3 was prepared, and everything was performed as in Experiment Example 12. However, the CFRP prepreg was produced as in Experiment Example 9.

Specifically, just as in Experiment Example 9, five of the prepregs that had been cut were layered inside the baking jig 1, the releasing film 13 was placed over the copper alloy 11 and the prepreg 12, after which the hold-down PTFE blocks 14 and 15 were put in place, and everything was put into a hot air dryer. Here, iron weights of 0.5 kg each were placed on the PTFE blocks 14 and 15, power was turned on to the dryer, and the temperature was raised to 135° C. Heating was performed at 135° C. for 60 minutes, then the temperature was raised to 165° C. over a period of 10 minutes, held for 40 minutes at 165° C., and then the power was shut off and the contents were allowed to cool with the door left shut. The product was taken out of the hot air dryer the next day, the copper alloy composite 10 was released from the baking jig 1, and the releasing polyethylene film was peeled away to obtain an object in the shape shown in FIG. 4. A tensile breaking test was performed on the second day after joining. The CFRP portion was sandwiched between two pieces of SUS 304 stainless steel with a thickness of 1 mm and that had been sanded with sandpaper, and this was clamped in a chuck. The shear breaking strength of the four sets on average was 35 MPa, which was extremely strong. As shown in FIG. 2, the joint surface area was calculated as l×m.

Experiment Example 14

Copper Alloy and Adhesive: Comparative Example

Just as in Experiment Example 1, C1100 tough pitch copper sheeting was cut into a rectangular copper alloy piece 25 measuring 45 mm×18 mm (see FIG. 2). An aqueous solution containing a commercially available aluminum alloy degreaser ("NE-6" made by Meltex) in an amount of 7.5% was adjusted to 60° C. and used as a degreaser aqueous solution, and an immersion tank was filled with it. The rectangular copper alloy piece 25 was soaked for 5 minutes in this to degrease it, and then was rinsed thoroughly with water. The piece was then soaked for 1 minute in a 1.5% caustic soda aqueous solution adjusted to 40° C. in a separate tank, and rinsed with water to perform preliminary base washing. Next, an aqueous solution containing 98% sulfuric acid in an amount of 10% and 30% hydrogen peroxide in an amount of 20% was prepared as an etching solution. The temperature of this etching solution was adjusted to 25° C., and the copper alloy piece 25 treated by the above method was soaked for 10 minutes and then rinsed with water.

Next, an aqueous solution containing caustic soda in an amount of 10% and sodium chlorite in an amount of 5% was prepared as an oxidation aqueous solution in a separate treatment tank, this was adjusted to 65° C., and then the above-mentioned copper alloy piece 25 was soaked for 1 minute therein and rinsed thoroughly with water. Unlike in Experiment Example 1, re-etching and re-oxidation were not performed after this, and the piece was dried for 15 minutes in a 90° C. hot air dryer. The dried copper alloy piece 25 was a dark reddish-brown in color, and it looked exactly the same as in Experiment Example 1. The copper alloy pieces 25 were wrapped in aluminum foil, then put in a plastic bag, sealed, and stored.

The day after the pieces were stored, one of them was measured for roughness using a scanning probe microscope, which revealed the mean length (RSm) of the roughness curve referred to in JIS to be from 13 to 15 μm, and the maximum roughness height (Rz) to be from 3 to 4 μm, meaning that the period between the convex and concave parts of the roughness was greater than in Experiment Example 1. Next, electron microscope observation was performed at 10,000 and 100,000 power, but it was exactly the same as in FIG. 5, and the fine texturing was the same as in Experiment Example 1. In other words, the roughness had a period that was too large to be called micron-order roughness, but otherwise a product substantially the same as in Experiment Example 1 could be produced. Using this product, a bonding experiment was conducted between metal alloys using EP106 in exactly the same manner as in Experiment Example 1. This was subjected to tensile breakage and the shear breaking strength was found; in a total of five sets, there was some variance between 18 and 27 MPa, with the mean being 20 MPa. The strength was clearly weaker than in Experiment Example 1.

Experiment Example 15

Copper Alloy and Adhesive: Comparative Example

A commercially available C1100 tough pitch copper sheeting with a thickness of 1 mm was purchased and the surface was lightly polished with 1000 grit sandpaper. This was cut into a rectangular copper alloy piece 25 measuring 45 mm×18 mm (see FIG. 2). An aqueous solution containing a commercially available aluminum alloy degreaser ("NE-6" made by Meltex) in an amount of 7.5% was adjusted to 60° C. and used as a degreaser aqueous solution in a tank. The rectangular copper alloy piece 25 was soaked for 5 minutes in this to degrease it, and then was rinsed thoroughly with water. The copper alloy piece 25 was then soaked for 1 minute in a 1.5% caustic soda aqueous solution adjusted to 40° C. in a separate tank, and rinsed with water to perform preliminary base washing. Next, an aqueous solution containing 98% sulfuric acid in an amount of 10% and 30% hydrogen peroxide in an amount of 5% was prepared as an etching solution, and the above-mentioned copper alloy piece 25 was soaked for 10 minutes in the above-mentioned solution adjusted to 25° C., and then rinsed with water.

Next, an aqueous solution containing caustic soda in an amount of 10% and sodium chlorite in an amount of 5% was prepared as an oxidation aqueous solution in a separate treatment tank, this was adjusted to 65° C., and then the above-mentioned copper alloy piece 25 was soaked for 1 minute therein and rinsed thoroughly with water. The piece was then soaked for another minute in the previous etching aqueous solution, after which it was rinsed with water, and again soaked for 1 minute in the oxidation aqueous solution and rinsed with water. This product was dried for 15 minutes in a 90° C. hot air dryer. The dried copper alloy piece 25 was a dark reddish-brown in color. The copper alloy pieces 25 were wrapped in aluminum foil, then put in a plastic bag, sealed, and stored.

After four days of this storage, one of the pieces was put under a scanning probe microscope and its roughness was measured. The average of six scans revealed that the peak-valley mean spacing (RSm) referred to in JIS was 18 μm, and the maximum roughness height (Rz) was 8.5 μm. Observation by electron microscope was also performed, but the result was the same as in FIG. 5. With this copper piece, the roughness period was large at greater than 10 μm, and was away from the micron-order roughness that is ideal with the present invention.

Using this product, a bonding experiment was conducted between metal alloys using EP106 in exactly the same manner as in Experiment Example 1. This was then subjected to tensile breakage and the shear breaking strength was found; in a total of five sets, there was variance between 15 and 25 MPa, with the mean being 21 MPa. The strength was clearly weaker than in Experiment Example 1.

The invention claimed is:

1. A method for manufacturing a copper alloy composite, comprising:
   a step of shaping a copper alloy part by machining from a casting or an intermediate material;
   a chemical etching step of immersing the shaped copper alloy part in an acidic aqueous solution containing an oxidant;
   a surface hardening step of immersing the chemically etched copper alloy part in a strongly basic aqueous solution containing an oxidant;
   a step of coating the hardened surface of the copper alloy part with an uncured epoxy resin;
   a step of adjusting a prepreg of a fiber-reinforced plastic by adjusting a size of the prepreg;
   a step of applying the prepreg to the coated side of the copper alloy part; and
   a step of positioning the prepreg and the copper alloy part, and heating the prepreg and the copper alloy part while holding them down, to cure the epoxy resin component.

2. A method for manufacturing a copper alloy composite, comprising:
   a step of shaping a copper alloy part by machining from a casting or an intermediate material;
   a chemical etching step of immersing the shaped copper alloy part in an acidic aqueous solution containing an oxidant, to form ultrafine texturing on the surface thereof;
   a surface hardening step of immersing the chemically etched copper alloy part in a strongly basic aqueous solution containing an oxidant;
   a step of coating the hardened surface of the copper alloy part with an uncured epoxy resin;
   a hardening pretreatment step of putting the copper alloy part that has been coated with the uncured epoxy resin in a sealed vessel, depressurizing, and then pressurizing to force the uncured epoxy resin into the ultrafine texturing on the copper alloy surface;
   a step of adjusting a prepreg of a fiber-reinforced plastic by adjusting a size of the prepreg;
   a step of applying the prepreg of a fiber-reinforced plastic to the coated side of the copper alloy part; and a step of positioning the prepreg and the copper alloy part, and heating the prepreg and the copper alloy part while holding them down, to cure the epoxy resin component.

3. The method for manufacturing copper alloy composite according to claim 1,
wherein the copper alloy part having micron-order roughness produced by the chemical etching step, whose surface, when observed by electron microscope, has ultrafine texturing in which holes or depressions that are circular in shape with a diameter of 10 to 150 nm or elliptical in shape with an average of major and minor diameters of 10 to 150 nm are present over substantially the entire surface at an irregular spacing of 30 to 300 nm, the surface being mainly a layer of cupric oxide.

4. The method for manufacturing copper alloy composite according to claim 2,
wherein the copper alloy part having micron-order roughness produced by the chemical etching step, whose surface, when observed by electron microscope, has ultrafine texturing in which holes or depressions that are circular in shape with a diameter of 10 to 150 nm or elliptical in shape with an average of major and minor diameters of 10 to 150 nm are present over substantially the entire surface at an irregular spacing of 30 to 300 nm, the surface being mainly a layer of cupric oxide.

* * * * *